(12) United States Patent
Baray et al.

(10) Patent No.: US 7,302,394 B1
(45) Date of Patent: Nov. 27, 2007

(54) FRONT-END DEVICE INDEPENDENCE FOR NATURAL INTERACTION PLATFORM

(75) Inventors: Cristobal H. Baray, Sunnyvale, CA (US); David A. Brooks, San Jose, CA (US); Damian M. Dolan, San Jose, CA (US)

(73) Assignee: Ianywhere Solutions, Inc., Dublin, CA (US)

( * ) Notice: Subject to any disclaimer, the term of this patent is extended or adjusted under 35 U.S.C. 154(b) by 919 days.

(21) Appl. No.: 10/326,452

(22) Filed: Dec. 20, 2002

Related U.S. Application Data

(60) Provisional application No. 60/342,231, filed on Dec. 20, 2001.

(51) Int. Cl.
*G10L 15/22* (2006.01)
(52) U.S. Cl. .......................... 704/257; 704/9; 704/275; 709/202; 719/328
(58) Field of Classification Search ...................... None
See application file for complete search history.

(56) References Cited

U.S. PATENT DOCUMENTS

| | | | |
|---|---|---|---|
| 5,500,920 A * | 3/1996 | Kupiec | 704/270.1 |
| 6,144,989 A | 11/2000 | Hodjat et al. | |
| 6,785,651 B1 * | 8/2004 | Wang | 704/246 |
| 6,859,451 B1 * | 2/2005 | Pasternack et al. | 370/352 |
| 7,027,975 B1 * | 4/2006 | Pazandak et al. | 704/9 |
| 7,137,126 B1 * | 11/2006 | Coffman et al. | 719/328 |

OTHER PUBLICATIONS

Nuance Communications Inc., "Developing Flexible Say Anything Grammars", Student Guide (2001), 79 pages.
Office Action mailed Sep. 13, 2005, in U.S. Appl. No. 10/133,580, application filing date Apr. 24, 2002.
Response A to Office Action, filed in the USPTO on Nov. 14, 2005, in U.S. Appl. No. 10/133,580, application filing date Apr. 24, 2002.
Office Action mailed Jan. 24, 2006, in U.S. Appl. No. 10/133,580, application filing date Apr. 24, 2002.
Repsonse B to Office Action, filed in the USPTO on Apr. 20, 2006, in U.S. Appl. No. 10/133,580, application filing date Apr. 24, 2002.
Final Office Action mailed Jul. 19, 2006, in U.S. Appl. No. 10/133,580, application filing date Apr. 24, 2002.
Response C to Final Office Action, filed in the USPTO on Sep. 11, 2006, in U.S. Appl. No. 10/133,580, application filing date Apr. 24, 2002.

(Continued)

*Primary Examiner*—Donald L. Storm
(74) *Attorney, Agent, or Firm*—Warren S. Wolfeld; Haynes Beffel & Wolfeld LLP

(57) ABSTRACT

Roughly described, a natural language interpretation system that provides commands to a back-end application in response to user input is modified to separate out user interaction functions into a user interaction subsystem. The user interaction subsystem can include an interaction block that is specific to each particular I/O agency, and which converts user input received from that agency into an agency-independent form for providing to the natural language interpretation system. The user interaction subsystem also can take results from the back-end application and clarification requests and other dialoguing from the natural language interpretation system, both in device-independent form, and convert them for forwarding to the particular I/O agency.

59 Claims, 6 Drawing Sheets

OTHER PUBLICATIONS

Response D to Final Office Action, filed in the USPTO on Oct. 19, 2006, in U.S. Appl. No. 10/133,580, application filing date Apr. 24, 2002.

Advisory Action mailed Sep. 25, 2006, in U.S. Appl. No. 10/133,580, application filing date Apr. 24, 2002.

Office Action mailed Nov. 2, 2006, in U.S. Appl. No. 10/133,580, application filing date Apr. 24, 2002.

Response E to Office Action, filed in the USPTO on Feb. 2, 2007, in U.S. Appl. No. 10/133,580, application filing date Apr. 24, 2002.

Office Action mailed Apr. 17, 2007, in U.S. Appl. No. 10/133,580, application filing date Apr. 24, 2002.

Response F to Office Action, filed in the USPTO on Jul. 17, 2007, in U.S. Appl. No. 10/133,580, application filing date Apr. 24, 2002.

Interview Summary mailed Jul. 24, 2007, in U.S. Appl. No. 10/133,580, application filing date Apr. 24, 2002.

* cited by examiner

FRONT-END DEVICE INDEPENDENCE FOR NATURAL INTERACTION PLATFORM

CLAIM OF PRIORITY

This application claims the benefit of U.S. Provisional Application No. 60/342,231, filed 20 Dec. 2001, which is incorporated herein by reference in its entirety.

REFERENCE TO COMPUTER PROGRAM LISTING AND TABLE APPENDICES

Computer program listings and Table appendices comprising duplicate copies of a compact disc, named "DEJI 1008-2 CPLA," accompany this application and are incorporated by reference. The appendices include the following files:

| File | Size | Status | Date |
|---|---|---|---|
| CD-Agent.java.txt | 14,359 bytes | created | Jul. 15, 2002 |
| CD-EmailIOMode.java.txt | 36,701 bytes | created | Jul. 15, 2002 |
| CD-InteractionAgent.java.txt | 10,618 bytes | created | Jul. 15, 2002 |
| CD-InteractionListener.java.txt | 1,101 bytes | created | Jul. 15, 2002 |
| CD-InteractionMessage.java.txt | 2,132 bytes | created | Jul. 15, 2002 |
| CD-InteractionResultMessage.java.txt | 2,102 bytes | created | Jul. 15, 2002 |
| CD-IOFormat.java.txt | 2,252 bytes | created | Jul. 15, 2002 |
| CD-IOMode.java.txt | 22,021 bytes | created | Jul. 15, 2002 |
| CD-MessageContent.java.txt | 5,384 bytes | created | Jul. 15, 2002 |
| CD-NaturalInteractionComponent.java.txt | 3,313 bytes | created | Jul. 15, 2002 |
| CD-NaturalInteractionRemoteObject.java.txt | 8,949 bytes | created | Jul. 15, 2002 |
| CD-opal.txt | 286,080 bytes | created | Jul. 15, 2002 |
| CD-StandardAgent.java.txt | 107,906 bytes | created | Jul. 15, 2002 |
| CD-SystemIOMode.java.txt | 4,482 bytes | created | Jul. 15, 2002 |
| CD-TextIOFormat.java.txt | 4,103 bytes | created | Jul. 15, 2002 |
| CD-WebIOMode.java.txt | 9,048 bytes | created | Jul. 15, 2002 |
| CD-XmlIOFormat.java.txt | 3,706 bytes | created | Jul. 15, 2002 |

COPYRIGHT DISCLAIMER

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

FIELD OF THE INVENTION

The invention relates to natural language interpretation systems, and more particularly to techniques for supporting natural user interaction with a back-end application via different kinds of I/O modalities.

BACKGROUND AND SUMMARY OF THE INVENTION

U.S. Pat. No. 6,144,989, incorporated by reference herein, describes an adaptive agent oriented software architecture (AAOSA), in which an agent network is developed for the purpose of interpreting user input as commands and inquiries for a back-end application, such as an audiovisual system or a financial reporting system. User input is provided to the natural language interpreter in a predefined format, such as a sequence of tokens, often in the form of text words and other indicators. The interpreter sometimes needs to interact with the user in order to make an accurate interpretation, and it can do so by outputting to the user an inquiry or request for clarification. In addition, the back-end application also needs to be able to provide output to the user, such as responses to the user's commands, or other output initiated by the application. AAOSA is one example of a natural language interpreter; another example is Nuance Communications' Nuance Version 8 ("Say Anything") product, described in Nuance Communications, "Developing Flexible Say Anything Grammars, Nuance Speech University Student Guide" (2001), incorporated herein by reference.

In the past, many natural language interpretation engines were designed to communicate with the user via a specific, predefined I/O modality. For example, some systems were designed to receive user input via a computer keyboard and to output results and clarification requests via a display monitor attached to the same computer as the keyboard. Other systems were designed to receive user input via a microphone and speech recognition software, and to provide output back to the user via text-to-speech software. Still other systems were designed to communicate with a user bidirectionally via the Web. Some systems were designed to support more than one I/O modality, but even then, the communication modalities were designed into the interaction system as a single unit.

Built-in communication mechanisms was problematical because, among other things, it was often necessary to re-program parts of the natural language interface whenever it was desired to support a new or different I/O modality. In addition, as the interface was reprogrammed to support new I/O modalities, it was difficult to maintain a consistent user feel for the application. A consistent user feel for a back-end application would afford a comfort level to the user, with both the application and the natural interaction platform, thereby increasing productivity and shortening the user learning curve.

Roughly described, the invention addresses the above problems by separating a user interaction subsystem from the natural language interpretation system. A user interaction subsystem can include an interaction block that is specific to a particular I/O modality and user device, and which converts user input received from that device into a device-independent form for providing to the natural language interpretation system. The user interaction subsystem also can take results from a back-end application in a device-independent form, and clarification requests and other dialoguing from the natural language interpretation system, and convert it to the appropriate format specific to the particular I/O modality and device. In this way all of the development for generating a natural language interpretation system optimized for a particular back-end application can be re-used for different I/O modalities and devices simply by substituting in a different interaction block into the user interaction subsystem. Similarly, all of the complications of interacting with particular modalities also can be concentrated in one module that is separate from the module(s) performing the natural language interpretation tasks.

In an embodiment, an interaction block includes an VO mode object that is specific to a particular I/O modality, and an I/O formatting object that is specific to the layout requirements of a particular I/O device. In an embodiment, the user interaction subsystem simultaneously supports more than one I/O device, such as by running several simultaneous instantiations of the I/O mode class for a particular modality, each referencing its own respective I/O Formatter object.

The following description, the drawings, and the claims further set forth these and other aspects, objects, features, and advantages of the invention.

BRIEF DESCRIPTION OF THE DRAWINGS

The invention will be described with respect to specific embodiments thereof, and reference will be made to the drawings, in which.

DETAILED DESCRIPTION

1. System Overview

Figure 1:
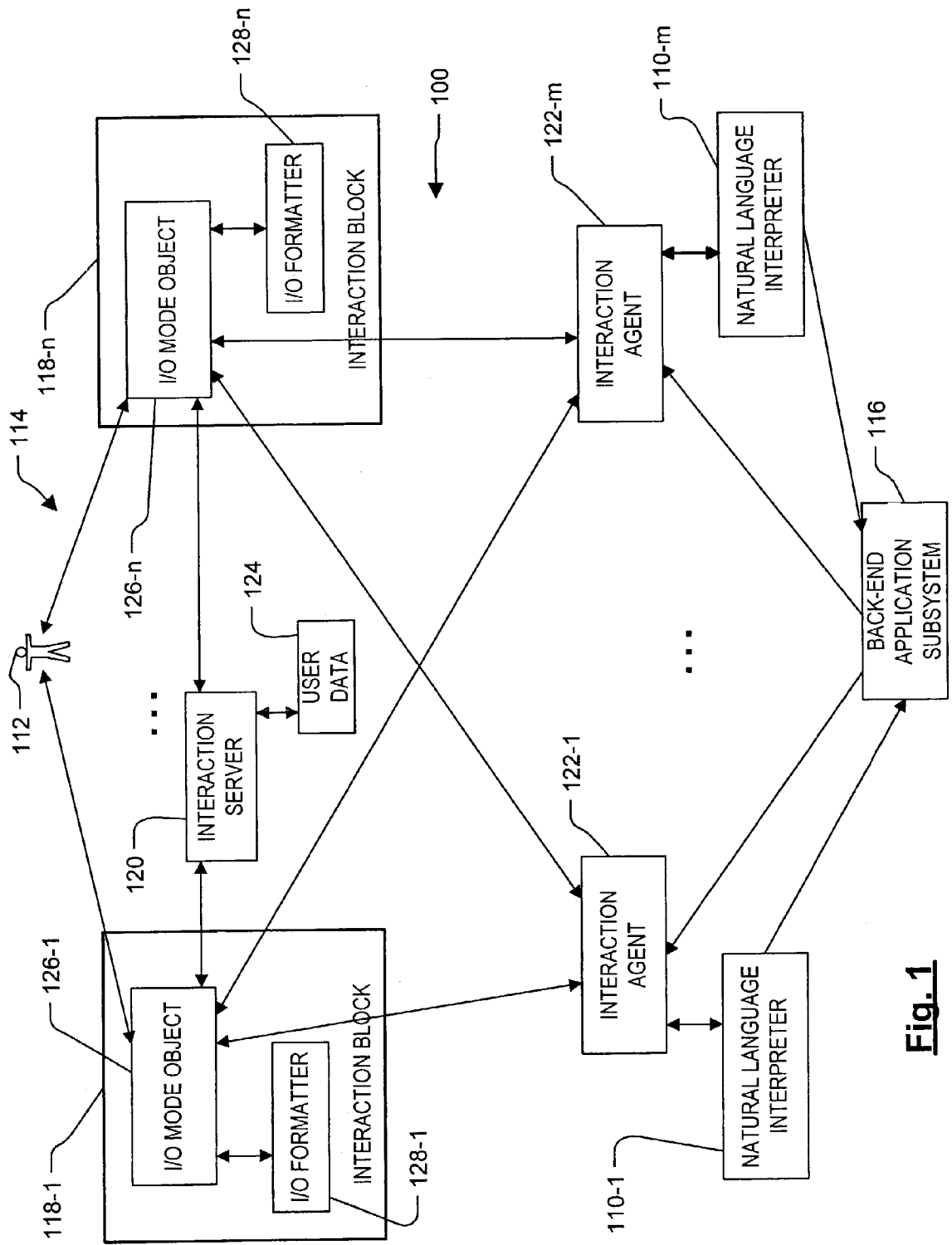
FIG. 1 is a functional block diagram overview of a system incorporating the invention.

FIG. 1 is a functional block diagram overview of a system 100 incorporating invention. It includes one or more natural language interpreters (NLIs) 110-1 . . . 110-*m* (illustratively 110) running under one or more Java virtual machines (JVM's), which can themselves be running on one or more different processors. Each natural language interpreter 110 communicates bidirectionally with a user 112 via an interaction subsystem 114. It receives commands from the user 112 via the interaction subsystem 114, and in some embodiments and in some situations, it can also generate replies back to the user 112 such as for requesting clarification or continuation of the user's input. The purpose of the natural language interpreter 110 is to attempt to discern the intent of the user 112 as evidenced by the input, and to generate actuation strings toward a back-end application subsystem 116 that describe the functionality that the user is requesting. If the back-end application subsystem 116 has a response, or if it desires to communicate with the user 112 on its own initiative, it transmits its communication back to the user 112 via the I/O subsystem 114. As used herein, user input can include input of all kinds, including commands, queries, inquiries, and so on. All of these terms are used interchangeably herein.

The interaction subsystem 114 includes one or more interaction blocks 118-1 . . . 118-*n* (illustratively 118). Each Interaction block 118 receives input from a user 112 via a different modality or I/O device and translates it into a device-independent form for use by the natural language interpreter 110. The interaction block 118 also receives output from the natural language interpreter 110 and/or the application subsystem 116, in a device independent form, and converts it to the appropriate form for presentation to the user 112 via the specific modality and device of the particular interaction block 118. As used herein, modalities are distinguished by the transport mechanism via which the interaction blocks communicate with the user 112. E-mail, World Wide Web, SMS, local computer console, and so on, are considered different modalities. I/O devices, the other hand, are distinguished by the layouts and amount of space available on the device for communicating with the user. PDAs, desktop computer consoles, and voice communication devices, for example, are considered different I/O devices. A single modality might be used to communicate with more than one kind of device. For example, e-mail transport might be used to communicate with desktop computer e-mail systems and also a PDA e-mail systems. The layout requirements of each of these devices might be very different even though the transport mechanism from the viewpoint of the interaction block 118 might be the same. On the other hand, multiple modalities might be used to communicate with a single kind of device. For example, the system 100 might communicate with a desktop computer device via e-mail, the Web, or via direct local computer console reading and writing. The layout requirements might be similar regardless of the transport mechanism used by the system 100 to reach the device, although the interaction block 118 must reach the device via different transport mechanisms. Typically (but not essentially) a different interaction block 118 is required for each combination of modality and I/O device. As used herein, an I/O agency is the combination of an I/O modality and an I/O device.

The system 100 runs on a Natural Interaction Platform that includes natural language interpreters 110, parts of the application subsystem 116, interaction agents 122, and interaction blocks 118, and also one or more interaction servers 120. Each instance of these components executes inside its own JVM, communicating with each other through RMI (Remote Method Invocation). Alternatively, in various installations some or all of the various components can execute together inside a single JVM.

The servers and components of the platform can be created or restarted independently with no particular sequence required. The I/O and interpretation components are launched with their RMI addresses and the RMI address of one or more interaction servers specified in the program argument list. The interaction servers 120 are launched with their RMI address and "Opal" configuration file specified in the argument list.

When an I/O or interpretation component is launched it binds itself to the RMI registry and starts a thread (Ping-Server) to check the state of servers 120 specified in the launch parameters. If a server 120 is available, the thread immediately registers the component with the server. If no server is available, then the thread periodically checks for an available server. When it finds one it will register the remote object component with the server. When an interaction server 120 is launched, it binds itself to the RMI registry and waits for remote components to register themselves. When a component registers, the server 120 creates a remote object property class (IOModeProperties for interaction blocks 118 and InterpretationNetworkProperties for natural language interpreters 110) that it stores to track and administer the components. This class starts a thread (PingRemoteObject) that periodically checks the existence of the remote object so that it can unregister the object from the server 120 if the object process terminates.

The remote components invoke methods in the interaction server through a NaturalInteractionServerInterface. These methods include mechanisms whereby components can register themselves with the server 120 and interaction blocks can request new interpretation sessions and register existing sessions. The interaction server 120 invokes methods in the I/O components through an IOModeInterface. The interaction server 120 and I/O components invoke methods in the interpretation components, including requests by the interaction blocks 118 for natural language interpretations, through an InterpretationNetworkInterface.

The interaction server 120 therefore manages the sessions with which an interaction block 118 works with a natural language interpreter 110. When an interaction block 118 receives input from a new user, it requests an interpretation session from the interaction server 120 with which the interaction block 118 is registered. The interaction block 118 can recognize a new user by methods that depend on the I/O modality, such as by email address for email modalities, phone number for SMS modalities, or HTTPSessionID for web modalities. The interaction server 120 accesses a user database 124 to validate the user and retrieve any required login information and session information for the back-end application subsystem 116, and then assigns a unique ID for the requested interpretation session. The interaction server 120 returns to the interaction block 118 with the interpretation session ID, the application login information and (in embodiments that support more than one natural language interpreter instantiation) an identification of an interaction agent 122 (discussed below) to which the interaction block 118 should route the user's requests. The interaction block 118 stores this information in a TimedHashtable and uses it to forward queries into the assigned natural language interpreter 110 originating from the particular user.

The system 100 is designed to recover automatically if any one of the processes fails, so long as there is at least one more instance of that process still running. If a natural language interpreter 110 fails, then any interaction block 118 that has a user assigned to that interpreter 110 will receive a remote exception when it tries to forward a user query to the interpreter 110. At this point the interaction block 118 returns to the interaction server, requests a new interpretation session, and submits the query to the new interpreter 110 assigned. If an interaction server 120 fails, pinging threads in the remote object components will detect this and try to register with another interaction server 120 or wait for a new one to be started. If an interaction block 118 fails, then it is up to the application subsystem 116 to detect this and route its output via other available I/O components.

2. Natural Language Interpreter

The natural language interpreter 110 can be any functional unit that attempts to discern from user input, the intent of the user relative to the back-end application. It receives commands from the user 112 (via the I/O subsystem 114), and outputs toward the back-end application subsystem 116 an indication of the function or functions that the NLI believes the user intends. Many NLIs operate in part by attempting to spot concepts in an incoming token sequence, typically by reference to specific keywords or classes of keywords. Some of the keywords are the concepts themselves (like "Monday" in the phrase, "I'll be there on Monday"), and some of the keywords are indicators of where the concept is likely to appear (like "on" in the same phrase). The NLI 110 can include, for example, Nuance Commumications' Nuance Version 8 ("Say Anything") product or an AAOSA agent network from Dejima, Inc.

In an AAOSA agent network, agents contain policy conditions which either do or do not apply to the incoming text string, and if they do, they make a claim to at least a portion of the incoming text string. Such claims imply a tentative interpretation of part or all of the input string. For example, if the back-end application subsystem 116 includes an airline reservation system, then an agent network in NLI 110 might be designed to include policy conditions to look for any of the words "depart", "departing" or "leaving", earlier in the text string than the word "from", which in turn is earlier in the text string than a city name.

Figure 2:
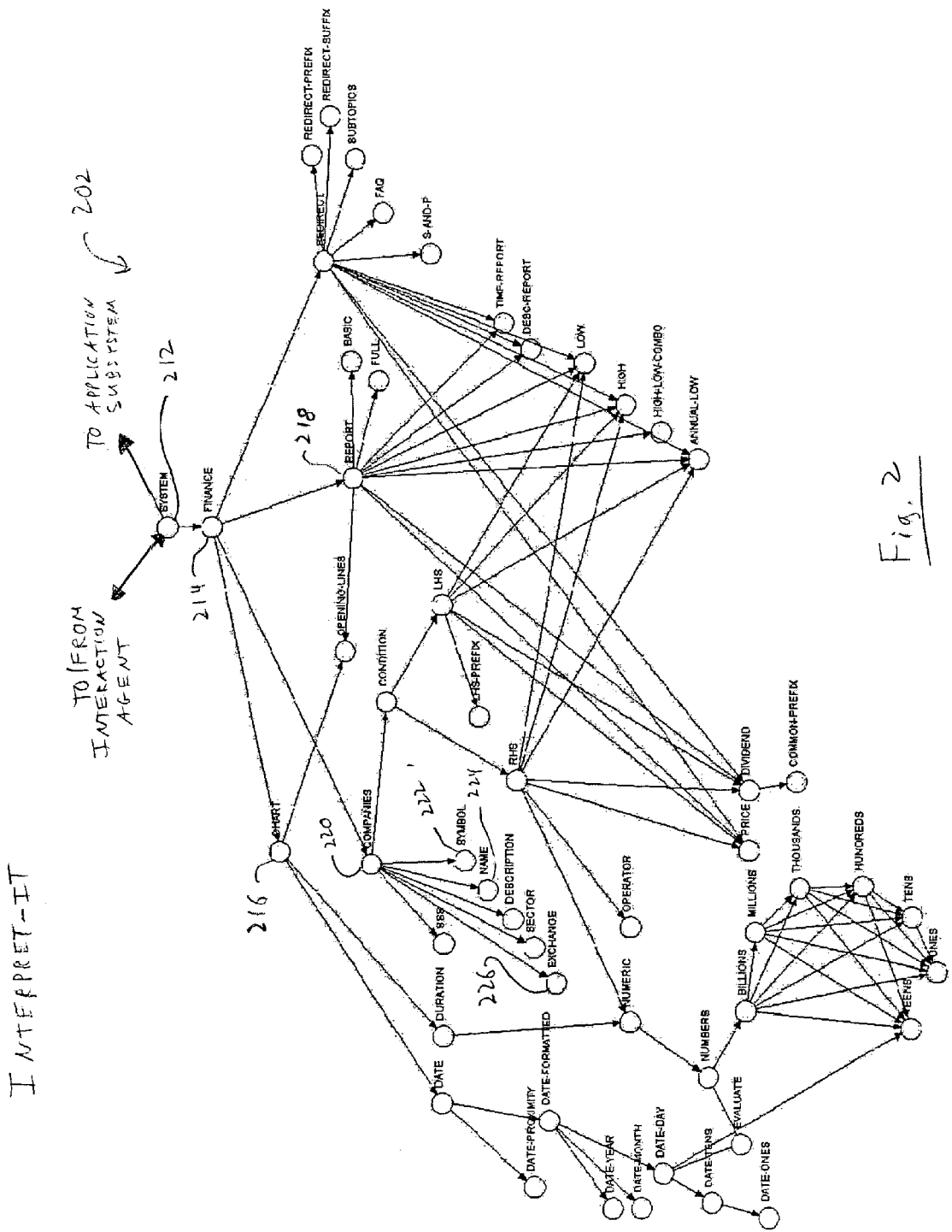
FIG. 2 is a diagram of an example natural language interpreter of FIG. 1.

FIG. 2 is a diagram of an example AAOSA agent network 202, used for implementing a natural language interface to a back-end application that is designed for financial reporting. In particular, the back-end application in this example is an Internet-queryable database provided by EDGAR Online, Inc. More information about the database can be found at http://www.finsight.com, visited Feb. 5, 2002, and incorporated herein by reference. This product permits a web client to retrieve desired financial information automatically using URL-based queries. The interface to this back-end application, therefore, includes the formulation of the appropriate URL for satisfying the user's inquiry.

Only a partial representation of the agent network 202 appears in FIG. 2. A more complete version of the network is described in the Opal file named CD-opal.txt in the accompanying Computer Program Listing and Table Appendices. An Opal file is an XML document which defines certain properties of each of the agents in an agent network. The agents themselves are implemented as instances of java classes and subclasses, and the Opal file specifies, for each agent and among other things, the specific class or subclasses from which the agent is to be instantiated, which other agents each particular agent listens to for each particular kind of message, as well as (for most agents) a set of one or more "interpretation policies" which implement the interpretation task for which the particular agent is responsible. The Opal file is used by an Opal converter program at system startup time to instantiate the entire agent network such as network 202. The Opal file in CD-opal.txt can be understood by a person of ordinary skill, especially with the assistance of the Dejima Policy Reference, Platform 3.0, a copy of which is attached hereto in Appendix A. In addition, it will be understood that the Opal file uses standard XML coding, in which (among other things):

| | |
|---|---|
| ![CDATA[ . . . ]] | indicates that " . . . " is to be interpreted as Character data; |
| &letter; | means "<" (left angle bracket) |
| > | means ">" (right angle bracket) |
| & | means "&" (ampersand) |
| ' | means "'" (apostrophe) |
| " | means " " (quotation mark) |

As described in the Dejima policy reference, an interpretation policy contains, among other things, a policy condition and a policy action. When an agent receives a message from another agent to attempt to interpret and input string, it compares the input string to each of the agent's policy conditions in sequence. If a condition does apply to the input string, or to part of the input string, then the policy makes a "claim" on the applicable portion of the input string, and returns the claim to the agent that requested the interpretation. A claim identifies (among other things) the agent and policy which is making the claim, the portion of the input string to which the claim applies (called the claim "focus"), the priority number of the agent or policy, and also a confidence level which indicates how well the input matches the policy condition. The priority and confidence levels, and the focus, all can be used subsequently by upchain agents for comparison with other claims made by other downchain agents, so as to permit the upchain agent to select a "best" one among competing claims.

Policy conditions are written as expressions made up from operators and operands. The various operators include unary operators such as <exists>, <exact>, <substring>, <accent>, <accent-substring>, REPEAT and RECURSIVE. They also include binary operators such as OR, AND, ORDERED, ADJACENT and COMBO. The operands on which an operator can act include tokens (words, strings, numbers, symbols, delimiters), text files (which can contain their own policy conditions), databases, and claims made by other policies. If a first policy condition (the "referencing policy condition") refers to a second policy (the "referenced policy") previously evaluated in the same agent, then any claim made by the referenced policy can be figured into the evaluation of the referencing policy condition in the manner specified by the operators. If a policy condition refers to another agent (the "referenced agent") downchain of the current agent (the "referring agent"), then the claim or claims returned by the referenced downchain agent are figured into the evaluation of the referencing policy condition in the manner specified by the operators. Note that a policy condition that references a downchain agent cannot be completely resolved until the input string is passed to that other agent for comparing to its own policy conditions. In one embodiment, the referencing agent passes the input string to each downchain agent only upon encountering the agent's name while evaluating a policy condition. In the present embodiment, however, the referencing agent passes the input string to all downchain agents mentioned in any policy condition in the referencing agent, before the referencing agent begins evaluating even its first policy condition.

Returning to FIG. 2, loading of the interpretation network is initiated by the interaction server 120 when it is initialized. The interaction server has the knowledge of which network (opal file) the system is using, and when this value is initialized or changed the server 120 tells all interpretation systems to load this network. The system then reads the Opal file (such as that in CD-opal.txt) and instantiates all of the agents designated therein. This includes the interaction agent 122, discussed below. Subsequently, when an input token sequence is ready, the I/O mode object 126 passes it to the interpretation network 202 by calling the Process method of an Interaction agent 122. Whenever the Interaction agent 122 receives a token string, it initiates an interpretation attempt into the agent network by communicating the input token sequence, in an object of class "InitiateInterpretationMessage", to the Top agent of the network. In the network of FIG. 2, the Top agent is System agent 212. The Top agent contains one or more interpretation policies whose policy conditions, in a typical network, do very little aside from referencing one or more other agents deeper in the network. System agent 212, for example, contains a single interpretation policy whose policy condition does nothing more than reference the Finance agent 214. Such a policy condition applies to the input token string if and only if the Finance agent can make a claim to at least part of the input token string. When System agent 212 encounters this policy condition, therefore, it forwards the input token string to the Finance agent 214 in an object of class "IntepretItMessage". The Finance agent 214 is thus considered to be "downchain" of the System agent 212, and the System agent 212 is considered to be "upchain" of the Finance agent 214.

When the Finance agent 214 receives the input token sequence, it first looks in its policies for policy conditions that make reference to further agents downchain of the Finance agent 214. If there are any, then the Finance agent 214 forwards the input token string to each of the further downchain agents in an "IntepretItMessage" and awaits replies. In the embodiment of FIG. 2, the Chart, Report and Companies agents 216, 218 and 220, respectively, are all referenced in the Finance Agent's policy conditions and are therefore downchain of the Finance Agent 214. Each agent downchain of the Finance agent 214 does the same upon receipt of an InterpretItMessage. When an agent has received all replies (or in certain embodiments, times out on all replies not yet received), the agent tests the input token sequence against the agent's policy conditions. The agent processes the input in order from the agent's first policy to its last policy. Each policy makes all the claims it can on the input. Subsequent policies in the agent can make reference to claims made by previously processed policies in the agent, as well as to claims made by downchain agents. After all policies have made their claims the agent uses a predetermined algorithm to select the "best" claim. If the best claim is one made from a non-grammatical condition (e.g. combo operator), then the sub-claims are also selected. The agent then returns the selected claim or claims to the agent's upchain agent in an object of class ClaimMessage. If the agent is not able to make any claims on the input, then the agent passes upchain an object of class NoClaimMessage.

Thus in the embodiment of FIG. 2, the Finance agent 214 eventually will receive any claims made by its downchain agents and will refer to such claims in the evaluation of its own policy conditions. The Finance agent 214 then will respond to the System agent 212 with either a ClaimMessage or a NoClaimMessage. If the System agent 212 receives a NoClaimMessage, then the System agent's single policy does not apply and no user-perceptible action is taken in response to the input utterance. If the System agent 212 receives a ClaimMessage, then the System agent's policy does apply.

The System agent 212 evaluates its own policy conditions in the same manner as other agents in the network, and each such policy again makes as many claims as it can on the input. But because the System agent 212 is the Top agent, it does not transmit any resulting claims (or NoClaims) to any further upchain agents. Instead, as the Top agent of a network, after selecting one or more "best" claim(s) in the manner described above, System agent 212 has the responsibility to delegate "actuation" to the agents and policies that made up the claim(s). This process, which is sometimes called "executing" the winning claim, takes place according to the "action" part of the winning policy or policies in the Top agent. The action part of a policy builds up an actuation string in a manner similar to that in which policy conditions build up the result of the condition, that is, by string operators and operands that can include words, numbers, symbols, actuation sub-strings already created by other policies within the same agent, and actuation sub-strings created by other downchain agents. Typically the downchain agents referred to in the action part of a policy are the same agents referred to in the condition part of the policy. Also typically, the actuation string built up by this process is an XML string.

In order to fill in the actuation sub-strings defined by downchain agents, the Top agent sends an object of class DelegationMessage to each downchain agent referenced in the action part of the winning policy(ies). In the embodiment of FIG. 2, the System agent 212 contains only one policy, the action part of which does nothing more than delegate to the Finance agent 214. The actuation sub-string returned by the Finance agent 214 therefore will be the actuation string output of the network. The DelegationMessage received by an agent includes a reference to the particular policy or policies of that agent which formed part of the winning claim. Upon receipt of such a message, therefore, the agent executes the action part of each of its policies that formed part of the winning claim, issuing DelegationMessages of its own to its own downchain neighbors as called for in the action part of the such policies, and building up an actuation sub-string for returning to the agent's upchain caller. Actuation sub-strings are passed to upchain agents in objects of class ActuationMessage, ultimately once again reaching the Top agent of the network (System agent 212). This agent then forwards the actuation message in the form of an XML string toward the back-end application subsystem 116 (FIG. 1).

Thus it can be seen that interpretation of the user's intent takes place in an agent network in a distributed manner. Each of the agents in agent network 202 can be thought of as having a view of its own domain of responsibility, as defined by its interpretation policies. Typically the application domain is organized by the designer into a hierarchy of semantic sub-domains, and individual agents are defined for each node in the semantic hierarchy. In the embodiment of FIG. 2, for example, the Finance agent 214 is responsible for all semantics that relate to finance (i.e., all queries in the entire application domain in this example). The Chart agent 216 is responsible for detecting and acting upon parts of user queries that have to do with financial charting, whereas Report agent 218 is responsible for detecting and acting upon parts of user queries that have to do with financial reporting. Companies agent 220 is responsible for detecting and acting upon parts of user queries that have to do with company names. The Companies agent 220 has downchain thereof a Symbol agent 222, responsible for detecting and acting upon parts of user queries that involve company names provided in the form of an trading symbol; a Name agent 224, responsible for detecting and acting upon parts of user queries that involve company names provided as a company name; an Exchange agent 226, responsible for detecting and acting upon parts of user queries that involve companies that are trading exchanges, and so on.

It can also be seen that the Top agent of a network is responsible for receiving input and initiating queries into the network, and the agents representing the functionality of the system (the agents constructing their actuation sub-strings without reference to further agents) are the lowest order nodes (leaf agents) of the network. The network operates in two main phases: the interpretation phase and the delegation phase. In the interpretation phase, an initiator agent (such as the Top agent) receives the input token sequence and, by following its policy conditions, queries its downchain agents whether the queried agent considers the input token sequence, or part of it, to be in its domain of responsibility. Each queried agent recursively determines whether it has an interpretation policy of its own that applies to the input token sequence, if necessary further querying its own further downchain agents in order to evaluate its policy conditions. The further agents eventually respond to such further queries, thereby allowing the first-queried agents to respond to the initiator agent. The recursive invocation of this procedure ultimately determines a path, or a set of paths, through the network from the initiator agent to one or more leaf agents. The path is represented by the claim(s) ultimately made by the initiator agent. After the appropriate paths through the network are determined, in the delegation phase, delegation messages are then transmitted down each determined path, in accordance with the action parts of winning policies, with each agent along the way taking any local action thereon and filling in with further action taken by the agents further down in the path. The local action involves building up segments of the actuation string, with each agent providing the word(s) or token(s) that its policies now know, by virtue of being in the delegation path, represent a proper interpretation of at least part of the user's intent. The resulting actuation string built up by the selected agents in the network are returned to the initiator agent as the output of the network. This actuation string contains the fields and field designators required to issue a command or query to the back-end application subsystem 116, to effect the intent of the user as expressed in the input token string and interpreted by the agent network.

3. Interaction Block

As mentioned, the interaction block 118 typically is specific to one I/O modality (or a group of very similar I/O modalities), and one I/O device (or a group of I/O devices that are very similar in their layout requirements). Although in one embodiment a single interaction block 118 class is usable with any back-end application, in the embodiment described herein it is specific, or somewhat specific, to a kind of application that includes back-end application subsystem 116. For example, if the back-end application is a financial reporting application, then the interaction block 118 might be generic to financial reporting applications from several suppliers. In the embodiment of FIG. 1, an interaction block 118 is further divided into two components, namely an I/O mode object 126 and an I/O formatter object 128. Specifically, interaction blocks 118-1 . . . 118-n include respective I/O mode objects 126-1 . . . 126-n (illustratively 126), and further include respective I/O formatter objects 128-1 . . . 128-n (illustratively 128). The aspects of an interaction block 118 that depend on the I/O modality are concentrated (typically exclusively) in the I/O mode object 126, and the aspects of an interaction block 118 that depend on the layout of information on the I/O device are concentrated (typically exclusively) in the I/O formatter object 128.

The I/O mode object 126 is the basic interface between a particular user interface modality (standard email, the web, SMS, a window on the user's screen, an e-mail modality that supports PGP encryption, etc.) and the NLI 110. The class defining each I/O mode object preferably is re-usable with any application and for any I/O device that supports the same transport mechanism as the I/O modality. There should be no application specific code in an I/O mode class definition. In some cases that might be unavoidable, however, so to include features specific to one kind of application, the I/O mode object 126 is instantiated from a generic base class, which is reusable for any kind of application, and a separate subclass specific to the kind of application targeted.

Each I/O mode object is responsible for:

Processing the user's input and building the appropriate query out of it. In an e-mail I/O mode object, for example, this might involve picking the mail off the mailbox, parsing the subject and body, and looking for the query. In a web I/O mode object, this might involve taking information from a webform.

Managing when the user will create a new context. A context is a conversation, including initial user interaction together with an optional set of followup interactions. Follow-up input usually involves resolution of ambiguity in previous input, narrowing down of previous input, next/previous relative to previous input, and so on. The I/O mode object does not maintain the context; it merely discerns whether or not the user intends new input to maintain context with previous interactions, and submits this intent to the NLI 110 together with the new query. In an e-mail I/O mode object, a user's intent to retain context might be discerned from the inclusion, in the subject line of the input message, of a context ID number that the system had included in the subject line of a previous outgoing message that the system had sent in response to previous user input. In a web I/O mode object, the user's intent to retain context might be discernced by looking for user selection in the webform of an explicit "retain context" check-box, for example. In some I/O mode objects, such as an SMS I/O mode object, the I/O mode object might not attempt to discern whether the user intends to retain context, but rather, it might always report to the NLI 110 that new user input is not a follow-up of previous input.

Rendering output to the user, whether it be a reply originating from the back-end application subsystem 116 or a clarification request or other output from the NLI 110 itself. In an e-mail I/O mode object, this might include creating a plain text response. In a web I/O mode object, this might include creating a proper html page, and so on.

Delivering the output to the user. In an e-mail I/O mode object, this might include composing a letter with the response as the body and forwarding it to an email program. In a web I/O mode object, this might include forwarding sending the HTML page back to the user's browser, and so on.

Figure 3:
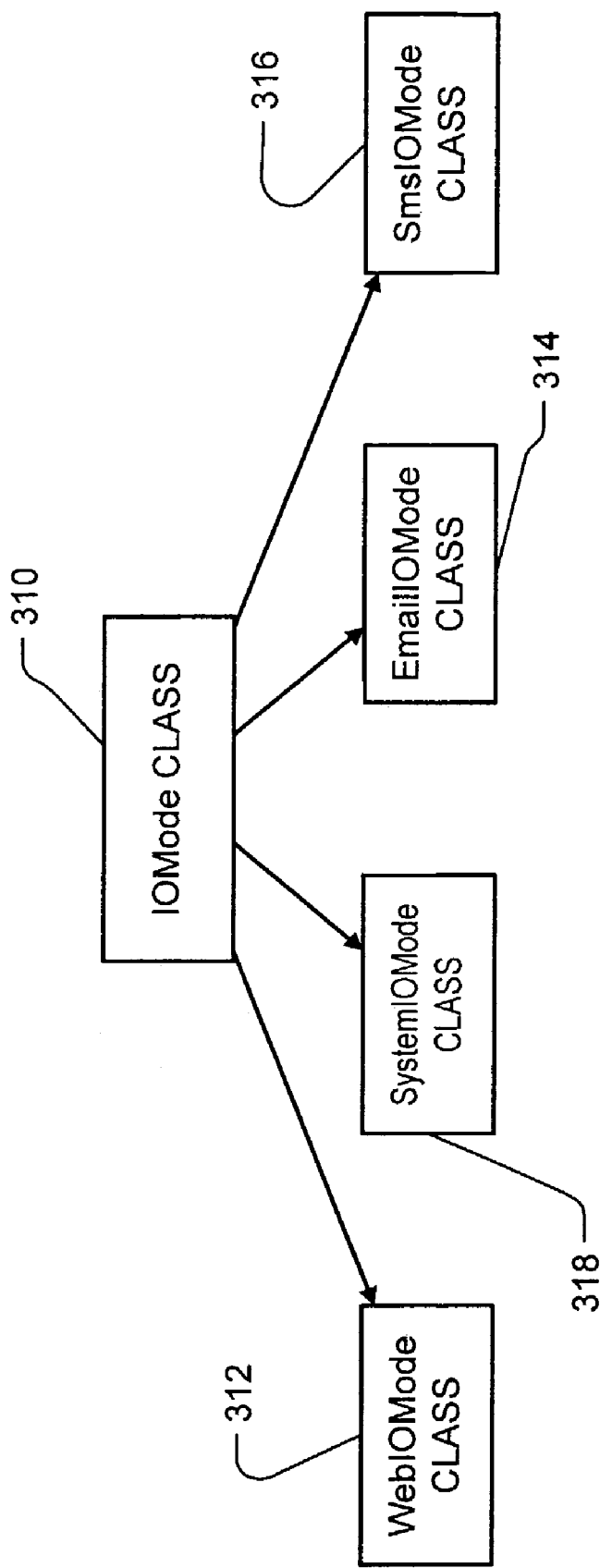
FIG. 3 is a class diagram of a sample I/O Mode Object class of FIG. 1.

FIG. 3 is a class diagram of a sample I/O Mode Object class and its subclasses. As shown, an IOMode class 310 has separate subclasses for each particular modality: a WebIOMode subclass 312 for web modalities, an EmailIOMode subclass 314 for email modalities, and an SmsIOMode subclass 316 for SMS modalities. The IOMode class 310 also has a SystemIOMode subclass 318 that provides a command line interface for debugging and stand-alone applications. An example IOMode class definition is set forth in the java file named CD-IOMode.java.txt in the accompanying Computer Program Listing and Table Appendices. The IOMode class extends a NaturalInteractionComponent class whose definition is set forth in the java file named CD-NaturalInteractionComponent.java.txt in the accompanying Computer Program Listing and Table Appendices. The NaturalInteractionComponent class extends a NaturalInteractionRemoteObject class whose definition is set forth in the java file named CD-NaturalInteractionRemoteObject.java.txt in the accompanying Computer Program Listing and Table Appendices, and the NaturalInteractionRemoteObject class extends the UnicastRemoteObject class which is defined in a conventional java RMI package. An example WebIOMode class definition is set forth in the java file named CD-WebIOMode.java.txt in the accompanying Computer Program Listing and Table Appendices, and an example EmailIOMode class definition is set forth in the java file named CD-EmailIOMode.java.txt in the accompanying Computer Program Listing and Table Appendices. An example SystemIOMode class definition is set forth in the java file named CD-SystemIOMode.java.txt in the accompanying Computer Program Listing and Table Appendices.

I/O mode objects are designed to be as much as possible application independent, but the format of the output of one kind of application is most likely unique and very different than the format of the output for another kind of application. For example, the format of output from a contacts manager is very likely to be very different from that of a financial reporting application. In addition, even for a single application, the layout of output required for a computer monitor is likely to be very different than that required for a PDA. To allow the I/O mode objects to remain application and device independent, their presentation methods are encapsulated within I/O formatter objects 128. Thus an I/O mode object 126 can take an I/O formatter object AX_iof for an application of kind A and a device of kind X, and the same I/O mode class definition can be used to instantiate an I/O mode object for application of kind B and a device of kind Y merely by being assigned an I/O formatter BY_iof. The I/O mode objects would behave the same way in essence, but the output of each I/O mode object would depend on the particular I/O formatter object 128 to which it is assigned. As examples, I/O formatter objects 128 can be designed for displaying display web pages on PDA's, for displaying e-mail on desktop computer monitors, for displaying e-mail on PDA's, for displaying SMS messages on SMS devices, and for formatting voice output for voice devices. In another embodiment, all of the presentation methods could be encapsulated in subclasses of a parent I/O Mode class, rather than in a separate I/O Formatter object.

An I/O formatter object 128 is assigned to each I/O mode object 126 at initialization. System output destined for user 112 is provided to the I/O mode object 126 in a generic form, such as an XML string, and the I/O mode object 126 calls methods of the assigned I/O formatter object 128 in order to convert the string to a new format that the I/O mode object 126 then can simply transmit to the user via the particular transport mechanism that the I/O mode object 126 is designed to use.

Figure 4:
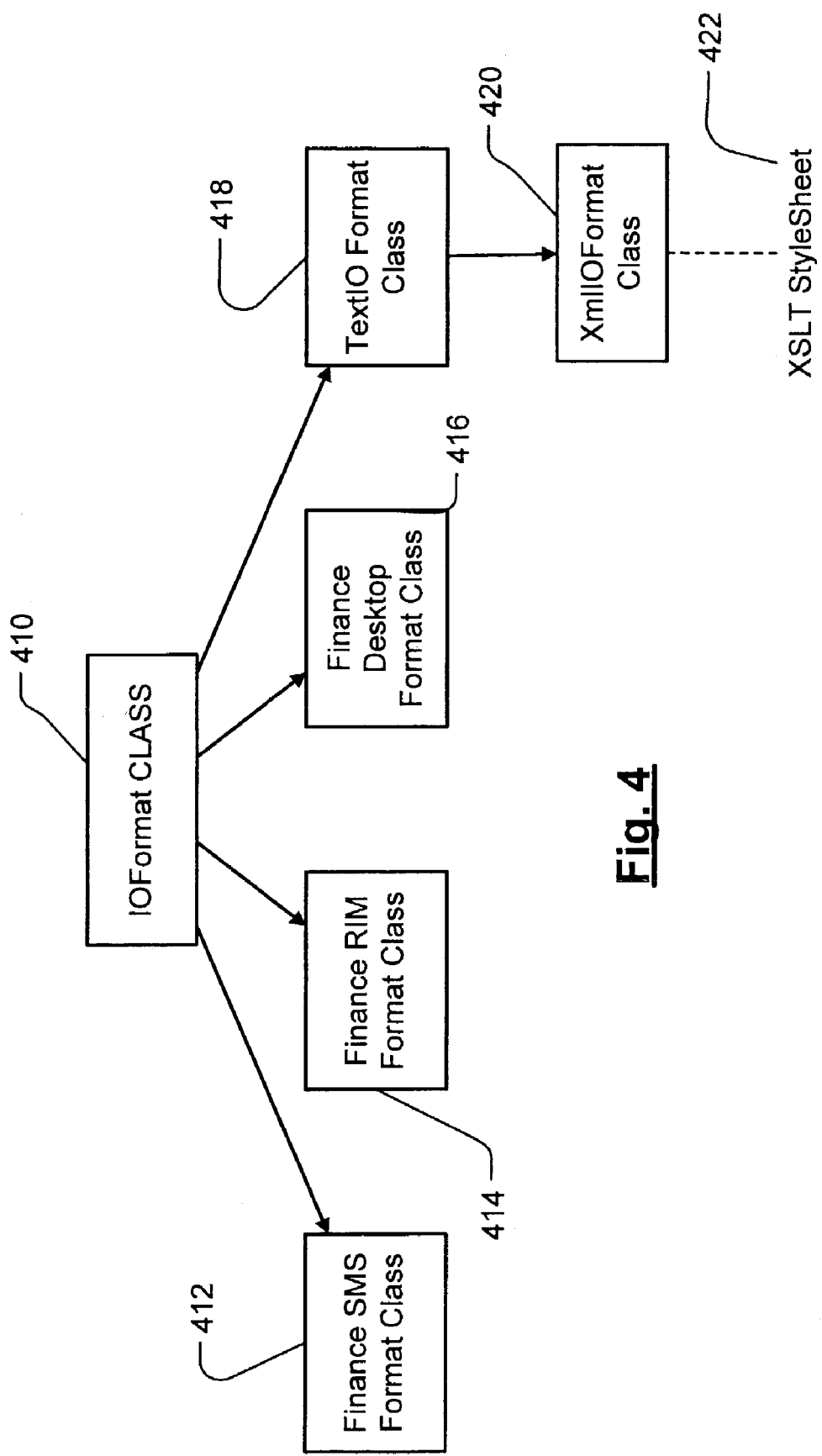
FIG. 4 is a class diagram of an I/O formatter class of FIG. 1.

FIG. 4 is a class diagram for an I/O formatter class 410 and its subclasses. Three of the subclasses shown in the diagram are specific to a particular kind of application (a finance application), and the fourth is not application specific. All of the subclasses are specific to a particular kind of I/O device: a Finance SMS IOFormat subclass 412 for SMS devices, a Finance RIM IOFormat subclass 414 for RIM devices, a Finance Desktop IOFormat subclass 416 for desktop computer devices, and a TextIOFormat subclass 418 for text-based devices. An example IOFormat class definition is set forth in the java file named CD-IOFormat.java.txt in the accompanying Computer Program Listing and Table Appendices, and an example TextIOFormat class definition is set forth in the java file named CD-TextIOFormat.java.txt in the accompanying Computer Program Listing and Table Appendices.

The TextIO Format class 418 also has an XML IO Format subclass 420, which provides the system designer with a standardized method for defining the formats required for various I/O devices. In particular, an object of class XmlIOFormat uses XML Stylesheet Transformations (XSLT) to define the formats. Such an object takes in an XML input originating from the NLI 110 or back-end application subsystem 116, uses an application- and I/O device-specific stylesheet 422 to transform the XML, and sends the transformed data toward the user 112. An example XmlIOFormat class definition is set forth in the java file named CD-XmlIOFormat.java.txt in the accompanying Computer Program Listing and Table Appendices. Note that for stylesheets, it may be preferable to use parameters and named-templates. For instance, the layout for an entire back-end application can be based on one generic template layout, with specific parts filled in according to the particular nodes that are in the output XML. Instead of having similar logic repeated throughout the stylesheet, the stylesheet processing can begin with the logic, use the logic to assign values to parameters, then call the named-template (representing the basic layout of the application) with the parameters (representing the values that should be used to fill in the template). This technique also allows easier re-use of the same logic across different I/O modalities, for example since e-mail and web modalities often use the same general logic.

4. Interaction Agent

In one embodiment, the NLI 110 communicates directly with an interaction block 118, and directly with the back-end application subsystem 116. In the embodiment of FIG. 1, however, the I/O mode object 126 processes information by way of method calls into the same or different java objects, whereas the interfaces to the NLI 110 are by way of messages. The embodiment of FIG. 1 therefore includes an interaction agent 122, which acts as a bridge between the messaging interface of the agent network in the NLI 110 and the method calls of the I/O mode object 126. As a bridge, it can be viewed either as part of the interpretation subsystem, or as part of the interaction subsystem 114, or both, or as a separate independent module. The main function of interaction agent 122 is to convert method calls from the I/O mode objects 126 into messages that it sends into the NLI 110, and to convert messages that it receives from either the NLI 110 or the application subsystem 116, into information returned by a method call made previously from within the I/O mode object. An example interaction agent class definition, in java, is set forth in the file CD-InteractionAgent-.java.txt in the CD-ROM appendix hereto. InteractionAgent-.java implements class InteractionListener, which is set forth in the file CD-InteractionListener.java.txt in the CD-ROM appendix. InteractionAgent.java also extends a StandardAgent class whose definition is set forth in the java file named CD-StandardAgent.java.txt in the accompanying Computer Program Listing and Table Appendices. The StandardAgent class extends an Agent class whose definition is set forth in the java file named CD-Agent.java.txt in the accompanying Computer Program Listing and Table Appendices.

The messages sent by the NLI 110 or the application subsystem 116 to the interaction agent 122 for forwarding toward the user 112 are objects of class InteractionMessage. A message of this class can contain any object within it, though the I/O formatter object that will process the message must know how to handle the data within the InteractionMessage. Facts (data from the system), questions (when more information is needed), and lists (when a choice must be made between several items—for ambiguities—did you mean A or B?) are all different types of data that can be contained within an InteractionMessage and formatted appropriately by the I/O formatter object. An example InteractionMessage class definition, in java, is set forth in the file CD-InteractionMessage.java.txt in the CD-ROM appendix hereto. The InteractionMessage class extends a MessageContent class whose definition is set forth in the java file named CD-MessageContent.java.txt in the accompanying Computer Program Listing and Table Appendices.

The messages sent by the interaction agent 122 into the NLI 110 are objects of class InteractionResultMessage. A message of class InteractionResultMessage generally encapsulates a user query, which is processed into a command by the agent network in the interpretation subsystem. Occasionally, a message of class InteractionResultMessage contains followup information from the user 112 and prior context. For example, when the user has answered a question, the answer to the question and the context of the question is maintained. An example InteractionResultMessage class definition, in java, is set forth in the file CD-InteractionResultMessage.java.txt in the CD-ROM appendix hereto. The InteractionResultMessage class also extends the MessageContent class mentioned above.

It can be seen that the above-described system separates the particulars of user interaction via various I/O agencies, from the natural language interpretation system and the back-end application subsystem. In this way, all of the development for generating a natural language interpretation system optimized for a particular back-end application can be re-used for different I/O agencies simply by substituting in a different I/O interaction block 118 into the user interaction subsystem. Similarly, all of the complications of interacting with particular agencies also can be concentrated in one module that is separate from the module(s) performing the natural language interpretation tasks.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

As used herein, an item is "identified" if sufficient information is provided to distinguish the item from other items. For example, information identifies an item if the information can be used to access data relating to the item rather than to access data relating to other items.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

Appendix A

Dejima Policy Reference

Platform 3.0

1 Introduction

Policies are written in a language called OPAL. This reference intends to describe the OPAL language. The current version of the platform can run in backward compatibility mode. In this mode some of the features described in this document would not be available. The comment "(not available in backward compatibility mode)" is written in front of each of these features. Set the system property USE_AMBIGUITY_XML to alse to run the platform in the backward compatibility mode. Example: java-DUSE_AMBIGUITY_XML=false IDE.

2 Policy

An AAOSA agent uses a set of policies to make claims on the input and to make actions based on those claims.

2.1 Overview of Claim

A claim is the part of the input that an agent policy recognizes as part of its domain. A claim may be built by putting together claims made by other policies or other agents. For example a HOME_ENTERTAINMENT policy may make claims based on claims made by a TV policy and a VCR policy. We would refer to TV and VCR claims as sub claims in the context of the HOME_ENTERTAINMENT claim.

2.2 Propagation of Claims

An AAOSA agent will use its policies to process the input when it receives an initiate interpretation, interpretation or reinterpretation message. Agents process the input in order from first policy declared in the agent to the last policy. Each policy makes all the claims it can on the input. Following policies can access these claims. After all policies have made their claims the agent selects the best claim. If the best claim is made from a non-grammatical condition (e.g. combo), then the sub-claims are also selected. The selected claims are handed up to up chain agents (i.e. using claim message).

2.3 Actuation of Claims

An Actuation is a standardized output. The actuation phase begins when the top AAOSA agent selects its best claim. The top agent will actuate the best claim using the action part of the policy that made that claim. The policy's action dictates whether the actuation of the claim should be delegated to other policies or agents. If the actuation is delegated to another agent a delegation message is sent to that agent. When an AAOSA agent receives a delegation message for actuating a claim, it will use the policy responsible for making that claim to actuate it. Each policy will either actuate the claim entirely or delegate parts of the actuation to other policies or agents responsible for making its sub claims.

2.4 Overview of Policy Components

A policy can have several components:
Name: Makes it possible to refer to the policy in OPAL language.
Title: Makes it possible to refer to the policy in the interactions and menus.
XML tags: Makes it possible to wrap the action in XML tags
Priority: Prioritizes the claim made by this policy.
Continuation: Sets the dependency of the claim to the claims made on previous input.
Condition: Makes claims by processing the input. A condition could be:
Terminal: Atomic operands of OPAL language.
References: Operands referring to claims made by other conditions.
Unary: A condition with only one operand.
Binary: A condition with two or more operand.
Action: Creates an action from a claim.

3 Claim

A claim quantifies how well an input matches a policy condition. The information associated with a claim includes:

3.1 Owner

The name of the policy making the claim and the agent to which that policy belongs.

3.2 Focus

The parts of the input matched by the policy condition. Focus is represented using the character indexes of the input. (Characters in the input are indexed from 0). For example, focus [5 . . . 8] represents the word 'book' in the input 'Sell book'. The characters of the input that correspond to the token separators (for example, white space) are never considered to be part of the focus. Therefore, a policy condition that matched 'Sell' and 'book' would have focus [0 . . . 3, 5 . . . 8]. However, when there is no chance of confusion, for convenience this focus would be written as [0 . . . 8].

3.3 Priority

The precedence of the claim. (For details on assigning priorities to claims, see the Policy Components section.) Priorities are local to an agent. When an agent sends a claim to an up chain agent, the priority is reset to 0. The exception is priorities that are assigned for adding dialoging focus. These priorities are passed up-chain with the claim.

A vector is kept of all different priorities that were associated to sub-claims building up a claim. The focus size of the sub-claims with the same priority will be added up and would be kept in the vector.

EXAMPLE 1

The priority vector of claim on 'aaa bb' made by policy P3.
P1: 'aaa' {priority:+1}
P2: 'bb' {priority: 0}
P3: P1 & P2
User-Input: 'aaa bb'

| Priority | 1 | 0 |
| --- | --- | --- |
| Focus size | 3 | 2 |

The priority criterion of two claims will be compared in the following manner:
1. The claim with highest priority will be chosen as the better claim.
2. If both claims have the same highest priority then the coverage percentage of that priority is compared. The coverage percentage is the focus size of that priority divided by the total focus size of that claim. The claim that has the higher coverage percentage will be chosen as the better claim.
3. If both claims have the same coverage on their highest priority then that vector will be compared again from step 1 disregarding the highest priority.

3.4 Ambiguity

A claim is said to be ambiguous if it contains two or more sub-claims with overlapping focuses. The ambiguity of the claim is equal to the number of ambiguous sub-claims that are found in the claim, including the claim itself.

3.5 Connection Weight

The total sum of connection weights assigned to operators making the claim. Each operator and operand has a predefined grammatical weight. The operators and operands in descending order of grammatical weight are:

1. Combo (,) and Recursive (+). Weight=∞. (loose connection)
2. Inexact matches. Weight=10000.
3. And (&). Weight=100.
4. Ordered (<). Weight=1.
5. Adjacent (and all other operators and operands). Weight=0.

3.6 Loose Connections Count

The number of Combo (,) or Recursive (+) operators used to make a claim.

3.7 Unknown

Used to identify the number of items missing in the user input (deprecated). See Section 3-3-4 on <unknown if missing> condition.

3.8 Adjacency Score

Indicates the relative closeness of the claimed parts of the input. Adjacency score is calculated by adding up the number of tokens between claimed parts. If a claim has marked 'Siamak' and 'Hodjat' on the input "Siamak is a Hodjat", its adjacency score is 2. A claim marking 'Sia' and 'Hodjat' on input "Siamak is a Hodjat", will also have adjacency score of 2, because 'Sia' is part of the 'Siamak' token, but the same claim will have an adjacency threshold of 5 on the input "Siamak's family name is Hodjat" (Assuming the default USTokenizer is used). The following table shows the how adjacency score is calculated for different inputs claimed by the policy: 'aaaaa' & 'bbbbb'.

EXAMPLE 2

Computing Adjacency Score

| Input | | Adjacency score |
|---|---|---|
| aaaaa | bbbbb | 0 |
| aaaaa | bbbbb | 0 |
| aaaaas | bbbbb | 0 |
| Aaaaa | cc bbbbb | 1 |
| Aaaaa | cc dd bbbbb | 2 |
| Aaaaa's | bbbbb | 2 |

Note that adjacency is handled slightly differently in the case of the combo operator. See the section on the combo operator for details.

3.9 Variable

Variables mark parts of the input that is not claimed by other conditions in a policy. Variables are adjustable and the part they mark may vary as the claim is manipulated (see variable condition).

4 Claim List

All claims made by policy conditions are added to an ordered list. The default criteria used to order the claims is as follows, listed in the order in which they are considered when comparing two claims. Each criterion is checked only if none of the criteria above it would apply. If two claims are equivalent with respect to all of the criteria, the claim that was made by the policy listed later in the Agent will win.

4.1 Coverage

A claim whose focus includes another claim's focus wins. If the focuses are equivalent, neither is considered to cover the other. For example, a claim made on 'Being John Malkovich' with focus [0 . . . 4] [6 . . . 9] [11 . . . 19] will win over a claim with focus [6 . . . 9] [11 . . . 19]. However, if two claims both had focus [0 . . . 4], the claims would be equivalent in terms of the coverage criterion.

4.2 Priority

A claim with higher priority wins. If the priorities are the same, the claim with the higher priority score will win. (See the Policy Components section on Priority for details on how priority and priority score are assigned.)

4.3 Ambiguity

A claim with more ambiguity wins. This criterion is checked only if the current claim can be merged with the claim it's compared to. (See Claim Manipulation in Appendix 3 for further information.) If two claims have equivalent ambiguity, the ambiguity due only to the current claim is compared. If this differs, the claim with the smaller local ambiguity will win (regardless of whether the two claims can be merged).

4.4 Connection Weight

A claim made by more grammatical operators and exactly matched operands wins (that is with smaller connection weight). If the connection weights of two claims are equal then the claim with fewer loose connections wins.

4.5 Adjacent

A claim with smaller adjacency score wins.

4.6 Focus Size

A claim with a larger focus wins. For example, a claim made on 'Sell Book and Buy Toy' with focus [0 . . . 3] [5 . . . 8], will win over a claim with focus [9 . . . 11] [13 . . . 15]).

4.7 Match Restrictiveness

A claim using a more restrictive token matcher wins. The most restrictive token matcher is the exact token matcher, which has a restrictiveness of 100. The substring token matcher has a restrictiveness of 60.

4.8 Variable

When comparing two claims the claims with no variables is better than a claim with variables. If both claims have variables then the one with more variables but smaller ones is preferred to the one with less but wider variables (see variable condition).

4.9 Unknown (Deprecated)

A claim with unknown element(s) will win over a claim with no unknown elements. If both claims have unknown elements the one with less unknown elements wins.

4.10 Default criterion:

A claim, which its focus is closer to the beginning of the input wins.

5 Policy Components 5.1 Name

Used to refer to the policy in the OPAL language. A policy name is a series of capital letters ('A' to 'Z'), digits ('0' to '9') or under score ('_') that begins with a capital letter. Policies names should be unique (in the scope of the agent they are declared in).

5.2 Title

Used to refer to the policy in interactions and menus. Spaces/symbols can be used in the title and it does not need to be in capital letters. The title is a literal and is automatically enclosed in quotes.

5.3 XML Tags (Not Available in Backward Compatibility Mode)

Figure 5:
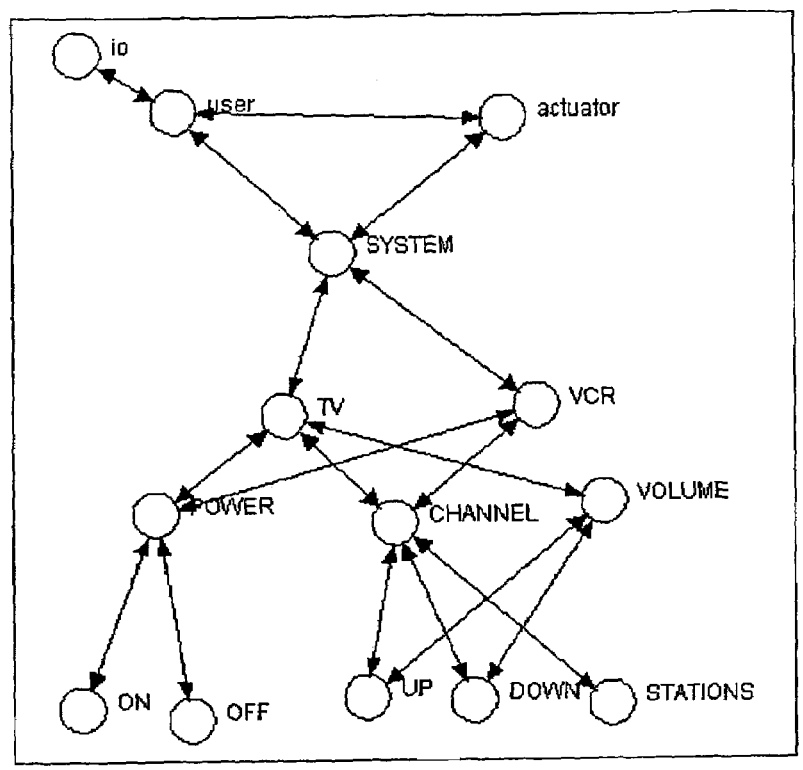
FIGS. 5-10 illustrate sample agent networks.

The interpretation network will support the generation of output that contains XML tags. This section will discuss the types of tags that will be used and how they are generated. It will use the AV Network as an example. See FIG. 5.

An XML tag is made up of three components
1. name: The name of the tag
2. parameter: The name of a tag parameter. Each tag may have 0 or more parameters.
3. value: The value of a tag parameter. Each parameter must have exactly one value.

A basic XML tag has the form:

<<name> [<parameter>="<value>"]> </<name>>

For example, a tag having two parameters would have the form:

<name parameter1="value1" parameter2="value2"> </name>

The interpretation network supports two parameters, type and ID. These are discussed in more detail later. For now, just note that the general form of an XML tag generated by the network is:

<name type="value1" ID="value2"> </name>

The XML tags that are supported by the interpretation network can be divided into four groups (two of which consist of a single tag):
1. The Interpretation Tag
2. The Ambiguity Tag
3. The Logical Tags
4. Domain Specific Tags The first three groups are common to all applications. The domain specific tags vary from application to application.

The tags are generated in two ways. The interpretation tag and the ambiguity tag are generated automatically by the interpretation network. The logical tags and domain specific tags are generated by setting the xml-tag and xml-type fields in the policy of a network agent.

As mentioned above, the system supports two parameters: type and ID. The type parameter is optional. For logical and domain specific tags, it can be specified by setting the xml-type field of a policy. The ID parameter is generated automatically by the system. Its value is equal to the ID of the claim that is being actuated by the policy.

| XML Tags Generated Automatically by the System | | |
|---|---|---|
| Tag Name | Type (optional) | Data Values |
| interpretation | none | none |
| xor | relation | none |

| XML Logical Tags Common to All Applications | | |
|---|---|---|
| Tag Name | Type (optional) | Data Values |
| and | relation | none |
| or | relation | none |
| lessThan | relation | none |
| greaterThan | relation | none |
| ifThen | relation | none |

| AV Network Application Specific XML Tags | | |
|---|---|---|
| Tag Name | Type (optional) | Values |
| TV | function | none |
| VCR | function | none |
| Power | parameter | none |
| Channel | parameter | none |
| Volume | parameter | none |
| On | attribute | none |
| Off | attribute | none |
| Up | attribute | none |
| Down | attribute | none |
| Station | attribute | PBS, CBS, NBC, etc. |

EXAMPLE 3

Simple Command

```
Input: 'Turn TV on'.
XML: <interpretation>
        <TV type="function" ID="1__">
            <power type="parameter" ID="2__">
                <on type="attribute" ID="3__">
                </on>
            </power>
        </TV>
     </interpretation>
```

EXAMPLE 4

Simple Command: Attribute with Values

```
Input: 'Turn TV to PBS'.
XML: <interpretation>
        <TV type="function" ID="1__">
            <channel type="parameter" ID="2__">
                <station type="attribute" ID="3__">
                PBS
                </station>
            </channel>
        </TV>
     </interpretation>
```

EXAMPLE 5

Compound Attributes

```
Input: 'Turn TV to PBS'
XML: <interpretation>
        <TV type="function" ID="1__">
            <and type="relation" ID="2__">
                <power type="parameter" ID="3__">
                    <on type="attribute" ID="4__">
                    </on>
                </power>
                <channel type="parameter" ID="5__">
                    <station type="attribute" ID="6__">
                    PBS
                    </station>
                </channel>
            </and>
        </TV>
     </interpretation>
```

EXAMPLE 6

Compound Commands

```
Input: 'Turn VCR off and TV volume down.'
XML: <interpretation>
        <and type="relation" ID="1__">
          <VCR type="function" ID="2__">
            <power type="parameter" ID="3__">
              <off type="attribute" ID="4__">
              </off>
            </power>
          </VCR>
          <TV type="function" ID="5__">
            <volume type="parameter" ID="6__">
              <down type="attribute" ID="7__">
              </down>
            </volume>
          </TV>
        </and>
     </interpretation>
```

EXAMPLE 7

Ambiguity

```
Input: 'Turn off.'
XML: <interpretation>
        <xor type="relation">
          <TV type="function" ID="1__">
            <power type="parameter" ID="2__">
              <on type="attribute" ID="3__">
              </on>
            </power>
          </TV>
          <VCR type="function" ID="4__">
            <power type="parameter" ID="5__">
              <on type="attribute" ID="6__">
              </on>
            </power>
          </VCR>
        </xor>
     </interpretation>
```

5.3.1 Generating XML Tags
Syntax: {XML tag: tag-name}
XML tag goes after the policy condition.

EXAMPLE 8

Generating XML tags

```
Policy::
(THEATERNAME:
  "
  'AMC' | 'century21
    {xml-tag: 'theaterName'}
    {action:
      {execute:*}}
  "),
Input: 'amc'
Output: <theaterName ID="1__"> amc </theaterName>
```

5.3.2 Generating XML Type Tags
Syntax: {XML tag: tag-name}
XML type tag goes after the XML tag. XML type is valid only if XML tag is provided for the policy.

EXAMPLE 9

Generating XML Type Tags

```
Policy::
(THEATERNAME:
  "
  'AMC' | 'century21
    {xml-tag: 'theaterName'}
    {xml-type: 'attrib'}
    {action:
      {execute:*}}
  "),
Input: 'amc'
Output: <theaterName type="attrib" ID="1__"> amc </theaterName>
```

5.3.3 Ambiguity Tags
Ambiguity tags are generated automatically.

EXAMPLE 10

Generating XHL Type Tags

```
Policy::
(MOVIENAME:
  "
  'john malkovich'
    {xml-tag: 'movieName'}
    {xml-type: 'attrib'}
    {action:
      {execute:*}}
  "),
(MOVIESTAR:
  "
  'being john mlkaovich'
    {xml-tag: 'movieStar'}
    {xml-type: 'attrib'}
    {action:
      {execute:*}}
  "),
(MOVIE:
  "
  MOVIENAME,MOVIESTAR
    {xml-tag: 'movie'}
    {action:
      {execute:*}}
  "),
Input: 'john malkovich'
Output:
<movie ID="1__"><ambiguity>
<movieName ID="2__">john malkovich</movieName>
<movieStar ID="3__">john malkovich</movieStar>
</ambiguity></movie>
```

5.3.4 Backward Compatibility
Using the backward compatibility mode will stop the automatic generation of the ambiguity XML tags and would prevent the XML tag and XML type from showing in the tree mode of policy editor.

5.4 Priority
The priority assigned to a policy. A policy's priority is assigned to all claims made by that policy.

Of the criteria used to order the claim list, priority is the only one that can be set explicitly in the policy. Priority is the second criterion used when comparing two claims; coverage is compared first. If two claims are equal in terms of coverage, then the one with a higher priority will win. Therefore, priority provides the policy writer with a good amount of control over which policy should produce the winning claims.

The default priority is 0. Priority can explicitly be set to any integer between −1000 and +1000, inclusive. A positive integer will give the claims made by the policy higher priority; a negative integer will give them lower priority.

A list is kept of all different priorities that were associated to sub-claims building up a claim. The focus of the sub-claims with the same priority will be added up and would be kept in the list.

EXAMPLE 11

The Priority List of Claims
P1: 'aaa' p=1
P2: 'bb' p=2
P3: 'cccc' p=2
P4: (A B) & C
User-Input: "cccc aaa bb".

| Priority | 2 | 1 |
|---|---|---|
| Focus size | 5 . . . 7 | [0 . . .3][9 . . . 12] |

The priority criterion of two claims will be compared in the following manner:
1. The claim with highest priority will be chosen as the better claim.
2. If both claims have the same highest priority then the coverage percentage of that priority is compared. The coverage percentage is the focus size of that priority divided by the total focus size of that claim. The claim that has the higher coverage percentage will be chosen as the better claim.
3. If both claims have the same coverage on their highest priority then that vector will be compared again from step 1 disregarding the highest priority.

Priority is used only for ordering the claim list of the agent containing the policy. When an agent passes a claim up chain, the priority of the claim is removed.

5.5 Continuation (Not Available in Backward Compatibility Mode)

The continuation field provides support for recognizing continuation in the interpretation network.

For example consider the following dialog:
01 User: "Movies starring Tom Hanks"
System: Lists all movies starring Tom Hanks
02 User: "And Meg Ryan"
System: Lists all movies starring Tom Hanks and Meg Ryan The interpretation network should recognize that the input 02 depends on the input 01. The "continuation field" is used to indicate if the interpretation of an input depends on the interpretation made on the previous input. The continuation field has the following syntax (which goes right after the policy condition):

{continuation: join}

EXAMPLE 12

Current input is a continuation:

P1:
/BOI 'and'

-continued

```
/*
/BOI is a terminal condition that claims the beginning of the input
*/
    {continuation: join}
    {action: {execute: 'Recognized dependency' }}
```

Whenever a policy is a join continuation then any claims made by that policy will be tagged as continued. Lets say the claim made by a policy with a {continuation: join} field would be part of the winning claim. If this is true then the input is going to be reinterpreted based on the claims made on the previous input. So in the above example the "And Meg Ryan" input will be claimed with dependency to the previous input ("Movies starring Tom Hanks") and therefore "And Meg Ryan" will be reinterpreted again but this time the claims made on the previous input ("Movies starring Tom Hanks") would be used.

5.6 Condition

Used to make claims from the input. Each condition will return a claim list of all claims it produces. There are four types of conditions: terminal, reference, unary and binary.

5.6.1 Terminal Condition

There are four types of terminal conditions:

Token Terminal Predefined patterns retrieved from a string, a file or a database.

Number Terminal Refers to claims made by other policies within the same agent.

Symbol Terminal Refers to claims made by other agents.

Type Terminal Refers to a part of the input not claimed.

5.6.1.1 Token

Tokens are identified based on the following parameters:
1. Alphabet: Defines letters as the normal token type. Example: Characters 'a' to 'z' define the English alphabet.
2. Number: Defines digits as the numeric token type.
3. Symbol: Defines special characters (i.e. not alpha or number) as the token type.
4. Delimiters: Defines what may separate tokens (e.g. white space, tabs, new line . . . ).
5. Tokenizer class: The class used to identify tokens based on the above parameters.

The above parameters are defined in properties/ParserParameters.xml. Whatever is not included as an alphabet, numeral or symbol is considered a delimiter by the tokenizer.

EXAMPLE 13

Defining alphabet in ParserParameters.xml
<Policy:Alphabet>
<Policy:CharacterRange lowerLimit="a" upperLimit="z" />
<Policy:CharacterRange lowerLimit="A" upperLimit="Z" />
<Policy:CharacterRange lowerLimit="　" upperLimit="￮" />
</Policy:Alphabet>

EXAMPLE 14

Defining numerals in ParserParameters.xml
<Policy:Numeric>

```
<Policy:CharacterRange lowerLimit="0" upperLimit="9" />
</Policy:Numeric>
```

EXAMPLE 15

Defining symbols in ParserParameters.xml
```
<Policy:Symbols>
<Policy:CharacterRange lowerLimit="!" upperLimit="/" />
<Policy:CharacterRange lowerLimit=":" upperLimit="@" />
<Policy:CharacterRange lowerLimit="[" upperLimit="" />
<Policy:CharacterRange lowerLimit="{" upperLimit="" />
</Policy:Symbols>
```
Note that based on example 11, the symbol $ will be recognized as a symbol because it is in the range between "!" and "/". But the symbol £ will not be recognized because it is not in any of the defined ranges. For it to be recognized as a symbol a new range would have to be added to the symbol definition ("£" is the Unicode for £).

EXAMPLE 16

Recognizing the £ Sign
```
<Policy:Symbols>
. . .
<Policy:CharacterRange lowerLimit="£" upperLimit="£"/>
</Policy:Symbols>
```
Other than the above-mentioned parameters, customized tokenizer classes may introduce application or language dependent types. The custom tokenizer class should replace USTextTokenizer in ParserParameters.xml.

A token is any stream of characters of the same type (e.g. alphabet, number, symbol) separated by delimiters or other tokens. Symbols are exception to this rule because symbols are broken up character by character.

EXAMPLE 17

Tokenizing

| Input | Tokens |
|---|---|
| 'John Smith' | 'john' |
| | 'smith' |
| 'mp3' | 'mp' (alphabet), |
| | '3' (number) |
| 'we are: "world's greatest" company' | 'we' (alphabet), |
| | 'are' (alphabet), |
| | ':' (symbol), |
| | '"' (symbol), |
| | 'world' (alphabet), |
| | ''' (symbol), |
| | 's' (alphabet), |
| | greatest (alphabet), |
| | '"' (symbol), |
| | 'company' (alphabet) |

To see details on number tokens, see the section on number terminals.

5.6.1.2 Token Terminals
  There are three types of token terminals:
  Strings
  Files (/F)
  Databases (/DB)

5.6.1.2.1 Strings

The condition applies if part of the input matches the string. The string is broken into tokens. The tokens are implicitly joined using the adjacent operator. Each token is matched using the default <exact, substring> match. See Section 5.3.3 on how each token is matched using <exact> and <substring>; see Section 5.4.4 on how the ADJACENT operator works.

EXAMPLE 18

String Condition
Condition: 'john malkovich'
User-Input: 'a john malkovich movie'
The condition will apply and will mark 'john malkovich' as claimed
User-Input: 'a john who is a malkovich movie'
The condition will not apply because 'john' and 'malkovich' are not adjacent in the input.
User-Input: 'a john malk movie'
The condition will not apply because 'malk' does not match 'malkovich'.
User-Input: 'a john malkovic movie'
The condition will not apply because 'malkovic' is a substring match of 'malkovich'.
The ', ", and/are special characters that should be referred to using %SINGLE_QUOTE %, %DOUBLE_QUOTE% and %BACK_SLASH% sequences.

EXAMPLE 19

Using Special Characters In String Condition
Condition:
  '%DOUBLE_QUOTE%malkovich%DOUBLE_QUOTE%'

User-Input: 'a "malkovich" movie'
The condition will apply.

5.6.1.2.2 Files (/F)

The condition applies if part of input matches one of the lines in a text file. By default, each entry in the text file can make a claim even if all its tokens are not found in the input.

EXAMPLE 20

The /F Condition
MN.txt:
sixth sense
being john malkovich
the wall
---
Condition: /F 'MN.txt'
User-Input: malkovich and sixth sense
The condition will apply and two claims will be made. The claims (in order) would mark the following:
'malkovich'
'sixth sense'
A claim will be made on only those input tokens that are in order.

EXAMPLE 21

The /F Condition
MN.txt:

being john malkovich
---
Condition: IF 'MN.txt'
User-Input: john malkovich
The condition will apply and will make the claim: 'john malkovich'

EXAMPLE 22

The /F Condition
MN.txt:
being john malkovich
---
Condition: IF 'MN.txt'
User-Input: malkovich john
The condition will apply and will make the claim: 'malkovich' (The claim on 'john' lost to the claim on 'malkovich').

The default behavior will change if token matchers (see Section 5.3.3, e.g. <exact>, <substring> . . . ) are applied to the /F condition. If token matchers are used then all tokens in the file entry must appear in the input adjacent and in order.

EXAMPLE 23

The /F Condition
MN.txt:
sixth sense
---
Condition: <exact>1F 'MN.txt'
User-Input: sense
The condition will not apply as 'sixth' does not appear in the input.

EXAMPLE 24

The /F condition
MN.txt:
sixth sense
---
Condition: <exact>1F 'MN.txt'
User-Input: sense sixth
The condition will not apply as 'sixth sense' does not appear in the input in the same order as the file.

EXAMPLE 25

The /F Condition
MN.txt:
sixth sense
---
Condition: <exact>'MN.txt'
User-Input: sixth a sense
The condition will not apply as 'sixth sense' is not adjacent in the input.

5.6.1.2.3 Common Files

A common file may be provided for an agent network to modify the behavior of file conditions (/F). To prevent unwanted claims made by file conditions create a common file. The common file should contain a list of common words (e.g. the, as, is).

EXAMPLE 26

The Problem (Why We Need Common File)
Common file not provided:
MN.txt:
sixth sense
being john malkovich
the wall
---
Condition: IF 'MN.txt'
User-Input: the movies in Sunnyvale
The condition will apply and one claim will be made on token
'the'.

EXAMPLE 27

How Common File Will Help
Common file provided:
common.txt:
the
being
---
Condition: /F 'MN.txt'
User-Input: the movies in Sunnyvale
The condition will not apply.
The file condition will ignore the common words only if they are not adjacent to a non-common word.

EXAMPLE 28

Common Files
Common file provided:
Condition: /F 'MN.txt'
User-Input: the wall
The condition will apply.

5.6.1.2.4 Databases (/DB)

The condition applies if part of input matches one of the columns in a database. A database spec file (in text format) should be provided for the /DB condition. This spec file should contain the following information:
  1. JDBC driver
  2. JDBC server location
  3. Database name (or ODBC data source name)
  4. Table Name
  5. Column Name
  6. Login
  7. Password

EXAMPLE 29

Defining Spec File for JDBC Connection to Pointbase Using /DB
  MS.spec:
  com.pointbase.jdbc.jdbcUniversalDriver
  jdbc:pointbase://192.168.0.26:1000/
  movies
  star
  star_name
  public
  public
---
Condition: /DB 'MS.spec'

EXAMPLE 30

Defining spec file for JDBC connection to Microsoft Access using /DB
  MS.spec:
  sun.jdbc.odbc.JdbcOdbcDriver jdbc:odbc:
movies
star
star_name
-----------------------------------------------
Condition: /DB 'MS.spec'

Known Issue:
The token matchers (e.g. <exact>, <substring>, ...) is not applicable to the /DB.

5.6.1.3 Number Terminal (/NUMBER)
The condition applies if a number token is found in the input (numbers are identified by the tokenizer).
You may also define a range for the /NUMBER condition.
Numbers are tokenized using the following rule:

<DIGIT>+[(COMMA|PERIOD)<DIGIT>+]+

EXAMPLE 31

Valid numbers:
34
34.5
3,456
3,456.56

Known Issues:

The following are also considered to be valid numbers:
3.4.5
23,3434,43
3.4,5
There is no way to explicitly declare the format of a number (i.e. integer, positive integer, negative integer, real, scientific notation . . . ).
Ranges acceptable in /Number is limited to long integer values ($\pm 2^{32}$) . . .
+ and − signs are not claimed by operator /NUMBER 5.6.1.4 Symbol Terminal (/SYMBOL)
The condition claims a single symbol in the input (numbers are identified by the tokenizer, refer to Section 5.4.1.1).

EXAMPLE 32

Symbol Terminal
Condition: /SYMBOL
User-Input: '@'
The condition will apply and the symbol @ will be claimed.

EXAMPLE 33

Symbol Terminal
Condition: /SYMBOL
User-Input: '#@%'
The condition will apply and the symbol # will be claimed.

5.6.1.5 Delimiter Terminal (/DELIMITER)
(Not Available in Backward Compatibility Mode)
The condition claims a delimiter in the input (delimiters are identified by the tokenizer, refer to Section 5.4.1.1).

EXAMPLE 34

Delimiter Terminal
Condition: 'blue'/DELIMITER 'book'
User-Input: 'blue book'
The condition will apply.
Claim: ['blue'] [' '] ['book'].
Delimiters are most useful when used in conjunction with variables. Note that Blanks are added to the beginning and the end of all text inputs automatically and therefore the beginning and the end of input is always a delimiter.

EXAMPLE 35

Delimiter terminal at the beginning of the input
Condition: /DELIMITER 'book'
User-Input: 'book'
The condition will apply.
Claim: [' '] ['book'].

5.6.1.6 Beginning of Input Terminal (/BOI)
(Not Available in Backward Compatibility Mode)
The condition claims the first character of the input that is always a blank space (blanks are added to the beginning and the end of all text inputs automatically).

EXAMPLE 36

BOI terminal
Condition: /BOI 'a'
User-Input: 'a'
The condition will apply.
Claim: [' '] ['a'].
User-Input: 'b a'
The condition will not apply.
User-Input: 'a b';
The condition will apply.
Claim: [' '] ['a'].

Important Notes:
The purpose of using /BOI should be to detect continuation (normally if the input depends on the previous input). Policies that detect continuation should not be referred in the policies that make relation between other policies.
It is recommended to always use <exists> operator along with the /BOI operators as normally the beginning delimiters themselves are not important.
This condition should only appear at the beginning of the policy condition (may follow the <exists> condition)

5.6.1.7 End of Input Terminal (/EOI)
(Not Available in Backward Compatibility Mode)
The condition claims the last character of the input that is always a blank space (blanks are added to the beginning and the end of all text inputs automatically).

EXAMPLE 37

EOI terminal
Condition: /EOI 'a'
User-Input:'a'
The condition will apply.
Claim: ['a'] [' '].
User-Input: 'a b'
The condition will not apply.
User-Input: 'b a'
The condition will apply.
Claim: ['a'] [' '].

Important notes:
The purpose of using /EOI should be to detect continuation (normally if the input depends on the next input).

Policies that detect continuation should not be referred in the policies that make relation between other policies.

It is recommended to always use <exists> operator along with the /EOI operators as normally the ending delimiters themselves are not important.

This condition should only appear as the last operator in policy condition.

5.6.1.8 Token Type Terminal (/TOKEN)

The condition applies if a user defined token type is found in the input. New token types could be defined in the tokenizer.

5.6.1.9 Check Condition (<check (agent, property, key; value)>):

Makes a claim only if an agent's property is equal to a specific value. This condition is especially useful for the AAOSA agents to know about the state of the application or device. For example the TV-agent in a TV/AV interface could use the <check> condition to know if the TV is on. If the TV is on and the user says 'power on' then the TV agent could generate the proper response. There are two types of properties that may be accessed through messaging:

a. Data property (basic objects)

b. Data store property (collection objects: hash tables, vectors, . . . )

Each agent must allow access to its data property by declaring it as a valid data property. The methods that should be sub-classed for this purpose are summarized in the following table:

| | Access permission | methods | Set message |
|---|---|---|---|
| Data Property | public Boolean IsValidDataProperty (String propertyName) | public void setData (String propertyName, Object value) Object getData (String propertyName) | <check (agent, property; value)> |
| Data Store Property | public Boolean IsValidDataStoreProperty (String propertyName) | public void setDataStoreElement (String propertyName, String propertyKey, Object propertyValue) public Object getDataStoreElement (String propertyName, String propertyKey) | <check (agent, property, key; value)> |

All AAOSA agents have a STATE property that could be checked (STATE is a basic property).

The parameters of a check message, <check (agent, property, key; value)>, are:

Agent: The agent address that its property is to be checked. This parameter is optional. If omitted then an agent will "check" its own property.

Property: The name of the property to be checked.

Key: The key to the data store property (as a string). This parameter is optional. If omitted then an agent will "check" a basic property.

Value: The value that the property will be compared to (as a string).

EXAMPLE 38

Check Condition
P1:
Condition: 'open' {action: {execute: 'door openned',set (DOOR, 'STATE',"; 'OPEN')}}),
P2:
Condition: <check(DOOR,'STATE',";'OPEN')>'open' (action: {execute: 'door is already open!'}}
User-Input: 'open'
If the state of the door is open then policy P2 will apply and when actuated it would reply with:'door is already open!'
See section 6.2.6 and 6.2.7 for more information on set and get.

5.6.2 Reference Conditions 5.6.2.1 Policy Reference

The condition applies if another policy has claims. A policy name is a series of capital letters ('A' to 'Z'), digits ('0' to '9') or under score ('_') that begins with a capital letter. A policy can only refer to policies that are declared before it.

5.6.2.2 Agent Reference

The condition applies if the referenced agent has claims. The referenced agent must be a listener to the agent that owns the policy.

An agent is referred to using its address. An agent address has the following format:

agent-instance-name . agent-class @ domain

An agent could be referred to only if it's agent-instant-name would be a series of capital letters ('A' to 'Z'), digits ('0' to '9') or under score ('_') that begins with a capital letter.

EXAMPLE 39

Agent Reference
DOWN.com.MySubClassedAAOSA@x
All agents in the same domain may be referred to using only the agent-instance-name. By default all agents are made in domain x.

5.6.2.3 Variables (?)

Variables behave and generate claims according to the following rules:

If the variable condition is bound by tokens on both sides of the condition, then all the tokens found between the boundary tokens are considered to be part of the variable and are added to the policy's claim. This type of variable condition is also known as an un-adjustable variable condition.

EXAMPLE 40

Variable Condition Bound from Both Sides
P1: 'in' ? 'folder'
Input: in my java folder
The variable condition in the claims made by P1 is bound from left by the 'in' token and from right by the 'folder' token. Therefore, "my java" is identified as the variable part of the input and is added to the claim's focus..

If the variable condition is bound only on either the left or right side of the condition, then the leftmost/rightmost token of the variable part of the input is added to the policy's claim. The variable part of the input is also referred as a left/right "adjustable" variable

EXAMPLE 41

Variable Condition Bound from One Side
P1: 'in' ?
Input: in java folder
In this case the variable is bound on the left by the 'in' token and the variable part is identified as "right adjustable". Per our rule, the "java folder" string is marked as the variable part of the input and "java" is added to the claim focus.
If a claim with a right (or left) adjustable variable is merged with another claim that does not have a variable part, then the variable part of the claim is adjusted by excluding all the tokens that are found from the beginning of the next claim focus.

EXAMPLE 42

Merging Variable Claims with Claims with No Variable Part.
P1: 'a' ?
P2: 'b'
P3: P1<P2
Input: a x y z b r
In this case, P1's subclaim variable part consists of the string "x y z" and its focus consists of "a" and "x" (second rule applies). When merged, P3's focus consists of 'a', 'x' and 'b'.
Claim list processing is performed as described in the policy reference. The variable length will be checked only after the appropriate checks for coverage, priority, ambiguity, connection weight, adjacency, focus size and restrictiveness are done.
If the variable condition does not mark any of the input, no claims are made.

EXAMPLE 43

No Claims are Made When the Input Contains No Variable Parts.
P1: 'in' ? 'folder'
Input: in folder
Or
P1: 'in' ?
Input: folders that are in
In both of these examples the variable condition does not mark any of the input and no claims are generated.
When comparing two claims, any claims with no variables are selected over claims with variables

EXAMPLE 44

Claims With No Variables Win Over Claims with Variables.
P1: 'a' ?
P2: 'a' 'b'
Input: a b
In this case, P2 will win over P1.
If two claims contain variables, then the claim with the greater number of variables wins.

EXAMPLE 45

Claims with greater number of variables win.
P1: 'a' ? 'b' ? 'c'
P2: 'a' ? 'c'
Input: a x b y c In this example, P1 will be selected over P2.
If two claims have the same number of variables, then the claim with the smaller variable length wins

EXAMPLE 46

Claims with Smaller Variable Length Wins
P1: 'a' ? 'b'
P2: 'c' ? 'd'
Input: a x b c j k d
In this example, P1 is selected as it has the smallest variable length.
Variable conditions may have a name assigned to them. A named variable condition consists of the variable operator followed by a semicolon followed by the variable name. For example, [?:First] is a valid variable name. References to variable names are only valid within the actions of the policy where the variables are declared.

EXAMPLE 47

Named Variables
P1: 'a' ?:A
  {action: {execute: ?:A}}
P2: P1 'b' ?:A
  {action: {execute: ?:A}}
Input: a x by
In this example, P2 will be selected as the best claim and the result of the actuation consists of 'y'.
The use of cascading variables is illegal and its behavior is undefined and not supported.

EXAMPLE 48

Cascading Variables
P1: 'in' ???
The use of unbound variable conditions is illegal and its behavior is undefined and not supported.

EXAMPLE 49

Unbound Variables
P1: ?

5.6.3 Unary Conditions:
  Unary condition is an operation on one operand. There are six basic unary conditions:
  Optional
  Exists
  Token matching
  Unknown
  Recursive
  Tag
5.6.3.1 Optional Condition ([operand]):
  This condition will always make a claim. The claim made depends on the operand:
    If the operand has a claim, then the optional condition will make the same claims as the operand.
    If the operand has no claims the optional condition will claim null, an empty claim with a focus of zero.

EXAMPLE 50

Optional Condition
Condition: ['actor'] 'john malkovich'
User-Input: actor john malkovich The condition will apply and will make the following claims:
'actor john malkovich'
'john malkovich'
User-Input: john malkovich
The condition will apply and will make one claim:
'john malkovich'
Policies should not be written in a way that they could make a null claim. For example, the following policies are not supported (although the SDK would not prevent them from being written):

EXAMPLE 51

Policy Conditions that Should be Avoided
P1: ['a']
P2: ['a'] ['b']
P3: ['a'& 'b' ]
Each of the above policies makes a null claim regardless of the input. An example of the bizarre behavior that would result is:

EXAMPLE 52

Avoiding Null Claims
P1: ['a']
P2: P1 & 'b'
User-Input: b
P2 will make a claim on 'b' with no reference to the null claim made by P1 and with connection weight 0 (the & operator will be ignored when calculating the connection weight).

5.6.3.2 Exists Condition (<exists> operand):
Checks to see if the operand has claims. If this is true, then the <exists>condition will make a null claim (an empty claim). If this is false, then the <exists> condition will not make a claim.

EXAMPLE 53

Exists Condition
P1:
Condition: 'starring' <exists> 'siamak'
User-Input: starring siamak
The condition will apply, and will claim 'starring'.
P1 condition will make the claim only if the word 'starring' appears in the input adjacent to claim(s) made by the token terminal 'siamak'.
User-Input: starring
The condition will not apply.
If binary conditions such as adjacent, and (&), ordered (<) and combo (,) appear in the same policy as the <exists> condition, then they behave as if <exists> condition is making claims on the input. For example:

EXAMPLE 54

Exists Condition
P1:
Condition: 'aaa' <exists> 'aaa'
User-Input: aaa aaa
The condition will apply and marks the first 'aaa' ([0 . . . 2]) as its claim.
User-Input: aaa
The condition will not apply, as there is no 'aaa' appears in the input before another 'aaa'.

Note that the scope of <exists> condition is only the policy in which it appears.

EXAMPLE 55

Exists Condition
P1:
Condition: 'aaa' <exists> 'aaa'
P2:
Condition: P1 'aaa'
User-Input: aaa aaa
The P2 condition will apply and will mark the first and second 'aaa' ([0 . . . 2] [4 . . . 6]) as its claim.
Policies should not be written in a way that they could claim null. That is the following policies are not supported (although the SDK would not prevent them from being written):

EXAMPLE 56

Policies that Should be Avoided
P1: <exists> 'a'
P2: ['a'] & <exists> 'b'
P3: <exists> ('a' & 'b')
Each of the above policies makes a null claim regardless of the input. An example of the bizarre behavior that would result is:

EXAMPLE 57

Policy Conditions that Should be Avoided
P1: <exists>'a'
P2: P1 & 'b'
User-Input: b
P2 will make a claim on 'b' with no reference to the null claim made by P1 and with connection weight 0 (the & operator will be ignored when calculating the connection weight).
When using <exists>, an agent is checking against a part of the input that it is not going to claim. Therefore the agent must be aware of parts of the input that are possibly another agent's responsibility. This is against the agent oriented programming style where an agent should only care about its own domain and should not worry about other domains. Therefore <exists> should always be avoided if possible. There is usually a better way to write the policies or configure the agent network to avoid the usage of <exists>.

5.6.3.3 Token Matching Condition
This unary operator defines the type of token matching applied to token terminals and file terminals. There are 6 types of token matching:

<exact>

<substring>

<accent>

<accent-substring>

<accent-edit-difference>
For details on using these condition with combination to file terminal (/F) please refer to the section on file terminals.

5.6.3.3.1 <exact>
An input token matches a terminal token only if they are the same length and all their characters are exactly the same.

EXAMPLE 58

<Exact> Condition
P1:
Condition: <exact>'malkovich'
User-Input: 'malkovic'
Claim: malkovic
The condition will not apply.

5.6.3.3.2 <substring>
Two tokens match only if there is an exact match or:
a) Both tokens are larger than 3 characters (this number can be changed in ParserParameters.xml).
b) The beginning characters must have an 80% match, starting with the first characters. This percentage can be changed in ParserParameters.xml If the size of input token getting matched is less than the size of pattern, the input token will be claimed otherwise only the matched part of the input token will get claimed.

EXAMPLE 59

Substring Matching
P1:
Condition: <substring>'malkovich'
User-Input: 'malkovic'
The condition will apply (note that the length of user input is less than the pattern's)
Claim: malkovic
P1:
Condition: <substring> 'malkovich'
User-Input:'malkovichab'
The condition will apply (note that the length of user input is greater than the pattern's).
Claim: malkovich
P1:
Condition: <substring> 'malkovich'
User-Input: 'malkovi'
The condition will not apply because it does not satisfy the 80% match.
Claim: N/A
P1:
Condition: <substring> 'malkovich'
User-Input: 'alkovich'
The condition will not apply because the starting characters do not match.
Claim: N/A 5.6.3.3.3 <accent>
Tokens are matched using a rule-based collator.

5.6.3.3.4 <accent-substring>
Similar to a substring matcher but <accent-substring> matches the characters using a collator.

5.6.3.3.5 <accent-edit-difference>
Matches two tokens using a rule based collator. The match allows missing or extra characters (less than a certain threshold currently defined in ParserParameters.xml). Tokens are matched only if they are larger than a certain length (currently defined in ParserParameter.xml).

5.6.3.3.6 Using Multiple Matchers
More than one token matching might be used to match terminal tokens. The matching will then be applied to the tokens one by one. If the first matching does not make a claim, the next matching in the list will be used.

EXAMPLE 60

Using Multiple Matches
P1
Condition: <exact , substring> 'malkovich'
User-Input: 'being john malkovic'
The condition will apply, and will mark the following:
  'malkovic' (substring match)
The default matching used are: <exact, substring>.

EXAMPLE 61

Default Matches (<Exact, Substring>)
P1
Condition: 'malkovich'
User-Input: 'john malkovic'
The condition will apply, and will mark the following:
  'malkovic' (substring match)
Token matching types could be also applied to file terminals (changing their default matchings)

EXAMPLE 62

Matching Types Applied to File Terminals
MN.txt:
sixth sense
being john malkovich
the wall
-------------------------------------------------
Condition: <exact, substring>/F 'MN.txt'
User-Input: malkovich and sixth sense
The condition will apply and only one claim will be made:
'sixth sense'
Each token matching type has a value, which shows how restrictive it is. The restrictive-ness values is a constant, predefined heuristically:

Exact (100)

Substring (60)

Accent (50)

Accent-Substring (85)

Accent-Edit-Difference (50)

5.6.3.3.7 Fast Matchers (<exact>, <substring>)
The matchers are categorized into fast and flexible matchers. The fast matchers are: <exact> and <substring>.

5.6.3.3.8 Flexible Matchers(<exact>, <substring>,<accent>, <accent-substring>, <accent-edit-difference>)
The flexible matchers include all fast matchers and the <accent>, <accent-substring> and <accent-edit-difference> matchers. These matchers are not included into the development platform by default unless the parserParameter.xml would be changed to include them by replacing the following line:

<Policy:TokenMatchers value="fast"/>

With:

<Policy:TokenMatchers value="flexible"/>

Note: It is not recommended to use the flexible matchers as they have a very poor performance.

5.6.3.4 Unknown Condition (<unknown if missing> operand)—deprecated:
Checks if the operand has claims. If this is true it will make the claim(s). If this is false, it will change the state of the claim to unknown (i.e. the operand is unknown). If a claim with unknown is actuated the system can prompt the user for clarification. How this prompting works and the attributes of the policies involved are discussed in section 4 (Actions).

EXAMPLE 63

Unknown Condition
P1:
Condition: 'starring' <unknown if missing> MOVIESTAR
User-Input: starring siamak
The condition will apply. P1 will claim 'starring', and change the state of the claim to unknown.

EXAMPLE 64

Unknown Condition
P1:
Condition: 'starring'<unknown if missing>MOVIESTAR
P2:
Condition: 'starring' <unknown if missing> <exists>MOVIESTAR
User-Input: starring bruce willis
P1 and P2 will both apply without changing the state of the claim.
P1 will claim the whole input but P2 will only claim 'starring'.
The <unknown if missing> operator is deprecated and it is recommended to use other approaches for dialoging (refer to section 6 for more information).

5.6.3.5 Recursive Condition (operand+):

The recursive condition makes new claims by merging subsets of the claims made by the operand. Specifically, each claim made by the recursive condition is the result of merging claims that form a maximal disjoint subset of the set of claims made by the operand. Two claims are said to be disjoint if their focuses do not overlap (that is, the intersection of their focuses is null). A set of claims is disjoint if every claim in the set is disjoint to every other claim in the set. A set is maximal if it is not a subset of any other set.

EXAMPLE 65

+Condition
MN.txt:
sixth sense
being john malkovich
--------------------------------------------------
Policy without Recursive Condition:
P1:
Condition: (/F 'MN.txt')
User-Input: 'being john malkovich and' 'sixth sense'
The condition will apply and will make two claims.
The claims (in order) will mark the following:
  1. 'being john malkovich'
  2. 'sixth sense'
Policy with Recursive Condition:
P1:
Condition: (/F 'MN.txt')+
User-Input: 'being john malkovich and 'sixth sense'
The operand makes the two claims above. The disjoint subsets of the operand claims are {1} (the set containing claim 1), {2} (the set containing claim 2), and {1, 2} (the set containing claims 1 and 2). The sets {1} and {2} are not maximal because they are subsets of {1, 2}. Therefore, the recursive condition will make a claim by merging claims 1 and 2. The claim will mark the following:
  1. 'being john malkovich', 'sixth sense'

EXAMPLE 66

+Condition
MN.txt:
fifth sense
sixth sense
being john malkovich
--------------------------------------------------
P1: (/F 'MN.txt')+
User-Input ='being john malkovich and sixth sense' The condition will apply and will make two claims. The claims (in order) will mark the following:
  1. 'being john malkovich', 'sixth sense'
  2. 'being john malkovich', 'sense'
Note that a claim is not made by combining the operands's claims on 'sixth sense' and 'sense' because the two claims are not disjoint. Another way to look at this is that merging these two claims would make an ambiguity. The recursive condition is not allowed to make new claims that have ambiguities.
A policy condition should not reference a recursive condition.

EXAMPLE 67

Policies Containing Recursive Conditions Should not in General be Referenced by Other Policies. The Recursive Condition Does not Generate all Possible Inner-Products.
  AB: 'a b'
  C: 'c'
  CD: 'c d'
  P1: (AB | C)+
  RECURSIVE: (P1 | CD)+
    0 2 4 6
  input: a b c d
  claims made by P1 recursive operand:
    1. AB: a b [0.2]
    2. C: c [4]
    3. CD: c d [4.6]]
  maximal disjoint subsets for AB and C:
    {1,2}
  claims made by P1:
    1. (AB, C): a b c [0.2.4]—best claim made by P1 Note that P1 does not propagage claims made by AB and C individually because the claims are each individually subsets of the maximal disjoint subset (1,2).
  claims made by RECURSIVE:
    1. (AB, C): a b c [0.2.4]
    2. CD: c d [2.4]—best claim made by RECURSIVE

EXAMPLE 68

An Example of Referencing Recursive Conditions in a Policy that Might go Unnoticed.
  P1: 'a' 'b'+
  Here the recursive condition is actually being referenced by the adjacent condition.
  Be careful of the common mistake illustrated in the following example, in which A agent is downchain of Top agent:

EXAMPLE 69

Common Mistake in +Operand Usage
A agent's policies:
P1: 'a'
TOP agent's policies:
P1: A+
User-input ='a a a'
The condition in TOP agent will apply and will only claim the first 'a' in the input (default criterion)

It might be expected that the TOP agent in the above example should claim the whole input ([0 . . . 0] [2 . . . 2] [4 . . . 4]). The reason it does not is that Agent A passes only its best claim up to the TOP agent. In other words, the recursive condition (like all other conditions) does not affect how a down chain agent makes claims on the input. If multiple claims on character 'a' are required, then Agent A should have a recursive condition of its own:

EXAMPLE 70

Correct Usage of +Operands
A agent's policies:
P1: 'a'
P2: P1+
TOP agent's policies:
P1: A+
User-input 'a a a'
The condition in TOP agent will apply and will claim all 'a's in the input.

In the latter example it is not necessary to have the recursive condition in the TOP agent. However, a good practice is to use a "catch all" policy, which applies the recursive condition to all of an agent's policies and down chain agents.

When two claims are merged using the recursive condition (and similarly the combo condition) then the resulting claim will have a loose connection. Claims with loose connections will fail to merge to other claims using the grammatical operators (such as &,<and adjacent).

EXAMPLE 71

Incorrect Usage of +Operands
P1: 'a'+
P2: P1 & 'c'
Input: a a c
P2 will not apply.

Performance Note: The performance of the recursive condition depends on the input and the claims made by the operand. The recursive condition has a built in time-out to limit the amount of time that will be spent in the condition. This time-out is currently set to twenty seconds. When the maximum allowed time has elapsed, the condition returns the set of claims generated up to that point. Each claim will indicate that it was made by a timed-out condition. This set will not necessarily include the best possible result. The algorithm starts by making claims that involve the best operand claim. The assumption is that these will most likely create the best overall claims.

EXAMPLE 72

Timing Out in Recursive Condition
P1: 'a'
P2: P1+
User-input='a a a . . . a'
The recursive condition can handle about 180 'a's in 20 seconds. If the number of 'a's goes above this, the condition will time out and return the results generated so far. The message 'had enough in recursive condition' will be logged in the err.txt file, and the resulting claim will be tagged as timed out.

Recommended usage of the recursive operator is only in the catch policy (described later in the reference).

5.6.3.6 Repeat Condition (^)

The repeat condition is used to repeat the application of the AND (&), ORDERED (<) or adjacent operators. The following table illustrates the behavior of each repeat operator:

| Repeat operator | What it means |
| --- | --- |
| A&^B | A&B&B&B&B . . . |
| A<^A | A<B<B<B<B<B . . . |
| A^B | A B B B B B . . . |

EXAMPLE 73

+̂ Operand
P1: 'book' | 'toy' | 'shirt'
P2: P1 'and' P1
User-Input: 'book and toy and shirt'
Condition P2 will apply and will make two claims:
  1. 'book and toy'
  2. 'toy and shirt'.
Now consider replacing P2's condition:
P2: P1 ^ ('and' P1)
Condition P2 will apply and will make three claims:
  1. 'book and toy and shirt'
  2. 'book and toy'
  3. 'toy and shirt'

EXAMPLE 74

&^ Operand
P1: 'a' &^ 'b'
User-Input: 'b b a b b x b'
Condition P1 will apply and will make the claim 'b b a b b b'.

EXAMPLE 75

<^ Operand
P1: 'a'<^ 'b'
User-Input: 'b b a b b x b'
Condition P1 will apply and will make the claim 'a b b b'.

EXAMPLE 76

^ Operand
P1:'a' ^ 'b'
User-Input: 'b b a b b x b'
Condition P1 will apply and will make the claim 'a b b'.
Note that repeat condition cannot be applied to OR and COMBO conditions conceptually.

5.6.4 Tag Condition (<tag: >operand):

Tags claim(s) made by an operand. The tags may be accessed later by the check tag condition. Tag is used to classify claims. Classifying claims allows a policy to know if the claim belongs to it or not.

EXAMPLE 77

Tag Condition
MN.txt:
being john malkovich
\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-\-
P1:
Condition: <tag: 'movie-name' >(/F 'MN.txt')+
User-Input: 'john malkovich'
The condition will apply making one claim.
The claims (in order) would mark the following:
'being john malkovich' (tag='movie-name')
Using tags and check tags means that an agent has to be aware of policies of another agent (which could be a policy of an agent which is not an immediate down chain). This is against the agent oriented programming style where an agent should not care about the policies of another agent and should not be aware of any agent other than its immediate down chains. Therefore tags and check tags should be avoided if possible. There is usually a better way to write the policies or configure the agent network to avoid the usage of tags.

0.5.6.4.1 Check Tag Condition (<check tag:> operand):
Filters out all claims made by an operand that does not have a specific tag.

EXAMPLE 78

Check Tag Condition
MN.txt:
being john malkovich
MS.txt:
john malkovich
MOVIE agent policies:
P1:
Condition: <tag: 'movie-name'> (/F 'MN.txt')+
P2:
Condition: <tag: 'movie-star'> (/F 'MS.txt')+
CINEMA agent policies:
P3:
Condition: <check tag: 'movie-star'> MOVIE
P4:
Condition: <check tag: 'movie-name'> MOVIE
User-Input: 'john malkovich'
The condition will apply, and CINEMA will make two claims.
The claims would mark the following:
'john malkovich' belongs to P4
'john malkovich' belongs to P3
Now that the claim is tagged the CINEMA agent knows which policy in MOVIE agent made the claims.

Using tags and check tags means that an agent has to be aware of policies of another agent (which could be a policy of an agent which is not an immediate down chain). This is against the agent oriented programming style where an agent should not care about the policies of another agent and should not be aware of any agent other than its immediate down chains. Therefore tags and check tags should be avoided if possible. There is usually a better way to write the policies or configure the agent network to avoid the usage of tags.

5.6.5 Binary Conditions

Binary condition merges claims made by two operands at the left and the right of a binary operator.

5.6.5.1 OR Condition (operand1|operand2):
Will apply only if at least one of the left or right operands has claims.

EXAMPLE 79

| condition
P1:
Condition: 'willis' | 'malkovich'
User-Input: 'willis'
The condition will apply, and will claim willis as the input.
User-Input: 'willis or malkovich'
The condition will apply, and will make two claims.
The claims (in order) would mark the following:
'malkovich'
'willis'

5.6.5.2 AND Condition (operand1 & operand2):
Will apply only if both left and right operands have claims.

EXAMPLE 80

AND Condition
P1:
Condition: 'john' & 'malkovich'
User-Input: 'malkovich whose first name is john'
The condition will apply, and will mark the following:
'malkovich' 'john'.
User-Input: 'john'
The condition will not apply.
The AND condition will apply only to those claims that have no loose connections.

EXAMPLE 81

AND Condition on Claims with Loose Connections
P1:
Condition: 'send', 'receive'
P2:
Condition: P1 & 'email'
User-Input: send and receive email'
Condition P2 will apply, and will claim the following:
'receive email'
'send email'.

5.6.5.3 ORDERED Condition (operand1<operand2):
Will apply only if both left and right operands have claims and the part of the input claimed by the left operand should come before the part of input claimed by right operand.

EXAMPLE 82

ORDERED Condition
P1:
Condition: 'john' <'malkovich'
User-Input: 'john whose family name malkovich'
The condition will apply, and will claim 'john' and 'malkovich'.
User-Input: 'malkovich whose first name is john'
The condition will not apply.
The ORDERED condition will apply only to those claims that have no loose connections.

5.6.5.4 ADJACENT Condition (operand1 operand2):

Will apply only if both left and right operands have claims, and the left operand claim appears just before (adjacent to) the right operands claim.

The claims made by left and right operands are merged, the resulting claim will be accepted only if the adjacency score of the merged claim is 0.

EXAMPLE 83

ADJACENT Condition
P1:
Condition: 'john' 'malkovich'
User-Input: 'john malkovich'
The condition will apply, and will claim the whole input.
User-Input: 'john smith malkovich'
The condition will not apply. As the adjacency score of the merged claim is 1.
The ADJACENT condition will apply only to those claims that have no loose connections.

5.6.5.5 COMBO Condition (operand1, operand2):
Will try to join the left and right operands to make all combinations of ambiguous or non-ambiguous claims.

EXAMPLE 84

COMBO Condition
P1:
Condition: <exact> 'johhn malkovich' | <exact> 'bruce willis'
P2:
Condition: <exact> 'being johhn malkovich' | <exact> 'sixth sense'
P3:
Condition: P1, P2
User-Input: 'bruce willis and john malkovich'
P3 will make three claims.
The claims (in order) are:
'john malkovich' (ambiguous, belongs to P1 or P2), 'bruce willis' (belongs to P1)
'john malkovich' (non-ambiguous, belongs to P1), 'bruce willis' (belongs to P1)
'john malkovich' (non-ambiguous, belongs to P2), 'bruce willis' (belongs to P1)
'john malkovich' (ambiguous, belongs to P1 or P2)
'john malkovich' (non-ambiguous, belongs to P1)
'john malkovich' (non-ambiguous, belongs to P2)
'bruce willis' (belongs to P1)

Note: This is the only condition that can make ambiguous claims.

Claims may not be merged together using a combo condition if the merge would cause ambiguity and one claim has a higher priority or a better connection.

EXAMPLE 85

When Priority Prevents Ambiguity
P1: 'a'
P2: 'a' {priority: 1}
P3: P1,P2
Input: a
The result will not be ambiguous as the priority of claim made by policy P2 is higher thab the priority of policy P1.
A better connection is defined to be based on the weight of the worst operator or operand used in a claim. The operators in order of weight are: adjacent, <,&. All operands in a claim have the same weight as the adjacent operator except for operands coming from the inexact matches of a database agent or a variable condition which have a weight worse than & and better than the combo (that weight is shown in the claim view as an INEXACT or INEXACT or ~).

EXAMPLE 86

When Connection Prevents Ambiguity
P1: 'a' 'b' 'c'
P2: 'a' 'b' &'c'
P3: P1,P2
Input: a b c
P3 will not make an ambiguous claim as P1's claim has a better connection (adjacent vs. &)
Note that the number of operators will not make any difference here:

EXAMPLE 87

When Connection Does not Prevent Ambiguity
P1: 'a' &'b'&'c'
P2: 'a' &'b' 'c'
P3: P1,P2
Input: a b c
P3 will be ambiguous as P1's claim has the same worst operator as the P2's claim (both are &)
When two claims are merged using the combo condition (and similarly the recursive, +, condition) then the resulting claim will have a loose connection. Claims with loose connections will fail to merg to other claims using the grammatical operators (such as &, <and adjacent).

EXAMPLE 88

Incorrect Usage of Combo Condition
P1: 'a','b'
P2: P1 & 'c'
Input: a b c
P2 will not apply.
The adjacency score of a claim made by a combo condition is not calculated directly from the focus of the claim (see adjacency score in Claim section). Instead it is calculated to be the sum of the adjacency scores of the sub-claims. For example, if P1 claims 'cat' and 'mouse' on the input 'cat dog mouse' and P2 claims 'dog', the adjacency score of (P1, P2) will be 1, whereas the adjacency score of (P1 & P2) will be 0. If P1 claims 'cat' on the input 'cat and dog' and P2 claims 'dog', the adjacency score of (P1,P2) will be 0, whereas the adjacency score of (P1 & P2) will be 1.

Recommended usage of combo operator is only in the catch policy (described later in the reference).

6 Actions
Actions transfers a claim to a standard format (e.g. an object containing XML)

6.1 Action types:

6.1.1 Action:
The action that can be carried out unambiguously. The fields are: Delegate To; Execute; Explain; and Ask.
Delegate to: This field is used to delegate the actuation of a claim to other agents or policies responsible for making the claim. If you use this field the other fields would be ignored.

Execute: The part that is ready to be executed by the application. This would be in a language of the application you're building the interface for (e.g. XML).
Explain: Human readable explanation of what was interpreted by the system (deprecated).
Ask: A question to be asked from the user to narrow down the result. The agent that asks the question gets priority (focus). The agent asking the question should be the same agent that could claim the answer (refer to section 6 for more information).

EXAMPLE 89

Ations
TV: ['TV'] 'on'
{title: 'TV'}
{action: {execute: 'TV ON!'} {explain: 'You asked to turn the TV on.'}
VCR: ['VCR'] 'on'
{title: 'VCR'}
{action: {execute: 'VCR ON!'} {explain: 'You asked to turn the VCR on.'}
HOME_ENTERTAINMENT: TV,VCR
{title: 'HOME_ENTERTAINMENT'}
{action: delegate to TV, VCR}
{ambiguity action: delegate to TV, VCR}
User Input: TV on and VCR off
Actuation:
You asked to turn the TV on. You asked to turn the VCR on.
TV ON! VCR ON!

6.1.2 Ambiguity:

The action that will be carried out when there is an ambiguity in the claim. This action item is only used to delegate actuation to the overlapping sub claims that have caused the ambiguity. The sub claims, which caused the ambiguity, would be actuated normally and their actuations would be put together to make the ambiguity choices.

Delegate to: This field is used to delegate the actuation of a claim to other agents or policies responsible for making the claim. If you use this field the other fields would be ignored.
Execute: The part that is ready to be executed by the application. This would be in a language of the application you're building the interface for (e.g. XML).
Explain: Human readable explanation of what was interpreted by the system (deprecated).
Choice: A question to be asked from the user to resolve the ambiguity. The choices should refer to the agents or policies that caused the ambiguity.

For example lets say the TV and VCR policies would have an overlapping claim that has been put together by HOME_ENTERTAINMENT policy:

EXAMPLE 90

Ambiguity
TV: ['TV'] 'on'
{title: 'TV'}
{action: {execute:'<TV value=on />'} {explain: 'You asked to turn the TV on.'}
VCR: ['VCR'] 'on'
{title: 'VCR'}
{action: {execute: <VCR value=on />} {explain: 'You asked to turn the VCR on.'}
HOME_ENTERTAINMENT: TV,VCR
{title: 'HOME_ENTERTAINMENT'}
{action: delegate to TV, VCR}
{ambiguity action: delegate to TV, VCR}
Which one do you mean?
You asked to turn the TV on. You asked to turn the VCR on.
  1. TV
  2. VCR When the system receives the input: 'on'. The HOME_ENTERTAINMENT claim will then be ambiguous (as the claims made by TV and VCR would overlap). So the actuation made by the HOME_ENTERTAINMENT would be based on actuations made by TV and VCR policies. The actuation would be a multi choice menu. The menu prompt would be the made by putting together the explain actions of the TV and VCR actuations, and the menu items would be the titles of TV and VCR policies.

The explain field is now being deprecated. Instead the execute field will replace the explain field (when it is not provided):

EXAMPLE 91

Ambiguity using Execute Field
TV: ['TV'] 'on'
{title: 'TV' }
{action: {execute: 'TV ON!'}}
VCR: ['VCR'] 'on'
{title: 'VCR'}
{action: {execute: 'VCR ON!'}}
HOME_ENTERTAINMENT: TV,VCR
{title: 'HOME_ENTERTAINMENT'}
{action: delegate to TV, VCR}
{ambiguity action: delegate to TV, VCR}
User-Input: On
System:
Which one do you mean?
<TV value=on /> <VCR value=on />
  1. TV
  2. VCR The idea is that a scripting language would then take the interaction and make the proper prompt.

Figure 6:
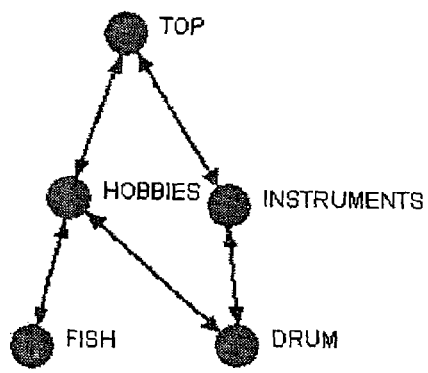

There are situations where there could be more than one questions asked for an ambiguity. For example the input bass in the network of FIG. 6 could generate ambiguity between FISH and DRUM or INSTRUMENTS and HOBBIES. The input 'bass' causes ambiguity in the HOBBIES agent (as bass could be a fish or a drum) and in the top agent (as bass can be a hobby or an instrument). Currently the system will find the source of the ambiguity and will only generate a question asking about that (in this case the source of ambiguity is if bass is a fish or a drum).

EXAMPLE 92

More than One Ambiguity (TOP:
"
  (HOBBIES, INSTRUMENTS) +
")
(HOBBIES:
"
  (FISH, DRUM) +
")
(INSTRUMENTS:

```
        "
      (DRUM) +
      ")
    (DRUM:
        "
      ('bass') +
      ")
  (FISH:
        "
      ('bass') +
      ")
User: bass
System:
Which one do you mean?
1: FISH
2: DRUM
3: Ignore input
Selection (choose one):
```

Figure 7:
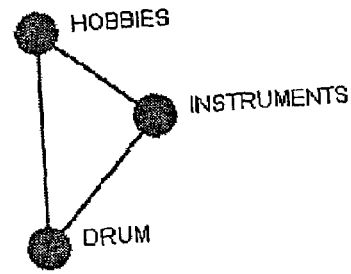

Known Issue:

There are network patterns that might lead to a too ambiguous situation. The following example demonstrates this situation. (See FIG. 7).

EXAMPLE 93

Too Ambiguous Error

```
(HOBBIES:
      "
    (INSTRUMENTS, DRUM) +
    ")
  (INSTRUMENTS:
      "
    (DRUM) +
    ")
  (DRUM:
      "
    ('bass') +
    ")
User: bass
System:
Input too ambiguous. Please rephrase!
```

6.1.3 Unknown Action (Deprecated):

The action that will be carried out if the claim has unknown (there are missing information in the input). The same four fields are available.

- Delegate to: This field is used to delegate the actuation of a claim to other agents or policies responsible for making the claim. If you use this field the other fields would be ignored.
- Execute: The part that is ready to be executed by the application. This would be in a language of the application you're building the interface for (e.g. XML).
- Explain: Human readable explanation of what was interpreted by the system (deprecated).
- Ask: A question to be asked from the user to narrow down the result. The agent that asks the question gets priority (focus). The agent asking the question should be the same agent that could claim the answer.

6.2 Action Building Blocks

Each field in the action forms (e.g. execute, explain, ask and choice) is created using variety of building blocks. When actuated each building block generates an output. These outputs would be put together to make the final action. Building blocks could be:

6.2.1 Strings

Outputs any information entered in quotes.

EXAMPLE 94

String Action Block

```
P1:
  'bruce willis'
    {title: 'movie star'}
    {action:
      {explain: 'You asked for a movie star' } }
  User-Input: bruce willis
  P1 will make a claim. If the claim would be delegated to policy P1 then
  the action would be: 'You asked for a movie star'.
```

6.2.2 Star (*)

Outputs which part of the input was claimed by a policy.

EXAMPLE 95

Star Action Block

```
P1:
  'bruce willis'
    {title: 'movie star'}
      {action:
        {execute: *}
User-Input: bruce willis
P1 will make a claim. If the claim would be delegated to policy P1 then
the action would be: 'bruce willis'.
```

6.2.3 Variable (?)

Shows which part of the input was marked as a variable in a claim. The variable action corresponds to the variable condition in the policy with the same name.

EXAMPLE 96

Variable Action Block

```
P1:
  'starring' ?:MOVIESTAR /DELIMITER
    {title: 'movie star'}
    {action: delegate to P1}
    {action:
      {execute: 'who is the movie star ',
        ?:MOVIESTAR ,' you are looking for?'} }
User-Input: starring siamak
P1 will make a claim. If the claim would be delegated to policy P1 then
the action would be:
Who is the movie star siamak you are looking for?
```

It is recommended to always use names with variables. However this is how multiple unnamed variables are handled:

EXAMPLE 97

Not Recommended Usage

```
P1:
  'send email from' ? 'to' ?
```

```
        {action: delegate to P1}
        {action:
            {execute: ? } }
User-Input: send email from Siamak to Kristi
P1 will make a claim. If the claim would be delegated to policy P1 then
the action would be: Siamak   Kristi
```

Note that variable trims the leading and trailing delimiters, but other delimiters are considered to be part of the variable. Multiple variables are trimmed after they are combined.

EXAMPLE 98

Variable Trimmings

```
P1:
    'being' ? '.'
        {action: delegate to P1}
        {action:
            {execute: 'var:',?,'.' } }
User-Input: being    john    malkovich.
P1 will make a claim. If the claim would be delegated to policy P1 then
the action would be: var:john    malkovich.
```

6.2.4 Policy Reference

Used as a reference to an action part of another policy.

EXAMPLE 99

Policy Reference Action Block

```
P1:
    'bruce willis'
        {title: 'movie star'}
        {action:
            {execute: '<movie-star=' , * , '</>'}
P2:
    'starring' P1
        {title: 'movie name'}
        {action:
            {execute: P1} }
User-Input: starring bruce willis
P1 will make a claim. If the claim would be delegated to policy P2 then
the action would be delegated to P1
    (the final result would be <movie-star=bruce willis</>)
```

6.2.5 Agent Reference

Used when the action part of another agent should be used to build this element.

EXAMPLE 100

Agent Reference Action Block

```
(In VOLUME agent)
P1:
DOWN
    {title: 'movie name'}
    {action:
        {execute: '<volume=' ,DOWN,' />'} }
(In DOWN agent, downchain of the Volume agent)
P1:
```
```
'down'
    {title: 'movie name'}
    {action:
        {execute: 'down'} }
User-Input: down
Policy P1 in VOLUME agent will make a claim. If the claim would be
delegated to this policy then the action would be delegated to DOWN
agent (the final result would be <volume=down</>)
```

6.2.6 Set Message (Set (Agent, Property, Key; Value))

The condition, set (agent, property, key; value), will cause the agent to sends a message to set a property in another agent. There are two types of properties that may be accessed through messaging:

c. Data property (basic objects)
  d. Data store property (collection objects: hash tables, vectors, . . . )

Each agent must allow access to its data property by declaring it as a valid data property. The methods that should be sub-classed for this purpose are summarized in the following table:

| | Access permission | Set method | Set message |
|---|---|---|---|
| Data Property | public Boolean IsValidData-Property(String propertyName) | public void setData( String propertyName, Object value, ChainIdentifier chainID) | <set (agent, property; value)> |
| Data Store Property | public Boolean IsValidDataStore-Property(String propertyName) | public void setDataStoreElement( String propertyName, String propertyKey, Object propertyValue, ChainIdentifier chainID) | <set (agent, property, key; value)> |

All AAOSA agents have a STATE property that could be set (STATE is a basic property).

The parameters of a set message, set (agent, property, key; value), are:

Agent: The agent address that its property is to be set. This parameter is optional. If omitted then an agent will "get" its own property.

Property: The name of the property to be set.

Key: The key to the data store property (as a string). This parameter is optional. If omitted then an agent will "get" a basic property.

Value: The value that the property should be set to (as a string).

EXAMPLE 101

Set Action Block.
    action: set (CLOCK, 'TIME'; '12:30')

6.2.7 Get Message (<get (agent, property, key)>)

Sends a get message to an agent, and shows the value replied by that agent. There are two types of properties that may be accessed through messaging:

e. Data property (basic objects)

f. Data store property (collection objects: hash tables, vectors, . . . )

Each agent must allow access to its data property by declaring it as a valid data property. The methods that should be sub-classed for this purpose are summarized in the following table:

|  | Access permission | Set method | Set message |
| --- | --- | --- | --- |
| Data Property | public Boolean IsValidData-Property(String propertyName) | public Object getData( String propertyName, ChainIdentifier chainID) | <get (agent, property)> |
| Data Store Property | public Boolean IsValidDataStore-Property(String propertyName) | public Object getDataStoreElement( String propertyName, String propertyKey, ChainIdentifier chainID) | <get (agent, property, key)> |

All AAOSA agents have a STATE property (STATE is a basic property).

The parameters of a get message, set (agent, property, key; value), are:

Agent: The agent address that it's property is to be set. This parameter is optional. If omitted then an agent will "get" its own property.

Property: The name of the property to be set.

Key: The key to the data store property (as a string). This parameter is optional. If omitted then an agent will "get" a basic property.

EXAMPLE 102

Get Action Block.
action: get(CLOCK, 'TIME')

6.3 Default Delegation

Whenever the action part of a policy is left empty a default delegation would be used. By default actions are delegated to policies responsible for making the sub claims. That is the policy:
POLICY2: AGENT1,AGENT2, POLICY1

Will be interpreted as:
POLICY2: AGENT1,AGENT2, POLICY1
    {action: delegate to AGENT1, AGENT2, POLICY1}
    {ambiguity action: delegate to AGENT1, AGENT2, POLICY1}
    {unknown action: delegate to AGENT1, AGENT2, POLICY1}

The default delegation could be overridden by filling the action part. For example the following policy:
POLICY2: AGENT1,AGENT2, POLICY1
    {action: {execute: *}}

Will be interpreted as:
POLICY2: AGENT1,AGENT2, POLICY1
    {action: {execute: *}}
    {ambiguity action: delegate to AGENT1, AGENT2, POLICY1}
    {unknown action: delegate to AGENT1, AGENT2, POLICY1}

6.4 Actuation

Each policy can make an actuation by applying the action part to the claim it made. Actuation may be built by putting together other actuations (just like claims). Each actuation will have four arms: execute, explain, ask, and choice. Each arm will contain a list of strings or pointers to other actuations.

There is a difference when an actuation is converted to a string if the building blocks of the actuation are listed in one field or different fields. When building blocks are listed together there would be no space between each block that is converted to a string.

EXAMPLE 103

Actuation Example

P1:
    'aaa bbb ccc'
    {action:
        {execute: 'aaa', 'bbb', 'ccc'}
User-Input: aaa bbb ccc
P1 will make a claim. If the claim would be delegated to policy P1 then the action would be: aaabbbccc.

When building blocks are listed in different fields there would be a space inserted between each block that is converted to a string.

EXAMPLE 104

Actuation.

P1:
    'aaa bbb ccc'
    {action:
        {execute: 'aaa', 'bbb', 'ccc'}
User-Input: aaa bbb ccc
P1 will make a claim. If the claim would be delegated to policy P1 then the action would be: aaa bbb ccc.

Implementation note:
The space is actually the default join style. The idea is to have different join styles that could be set in the policy. For example AND joins, OR joins, XOR joins, . . .

7 Putting it all Together

The agents are normally composed of 3 types of policies:

7.1 Tokens:

The condition of these policies has no reference to any other agent. The policies are made using binary and unary operators on token conditions, file terminals or database terminals.

7.2 Grammars

The condition of these policies makes grammatical relationship between the policies in this agent and its down chain agents. These grammatical relationships are made by using &, |, <, optional and adjacent operators. All that can be part of one command should be combined using the &, <or adjacent operators.

7.3 Catch Policy

The catch policy of an agent is used to make the claims that no policies were written to deal with. That includes different combination of commands and ambiguities that may occur. The catchall policy includes a combo of references to all other policies and down chain agents of that agent followed by a + operator. A | (or) condition should be used instead of a combo between any two policies or down chain agents which should never make ambiguities. For example, assume agents A, B and C are all downchain of Top agent.

TOP agent policies:

P1: . . .

P2: . . .

. . .

CATCH_ALL: (P1, P2, . . . , A, B, C)+

The following is an example of how a user interface could be built for a store where books and toy in different colors could be bought.

Figure 8:
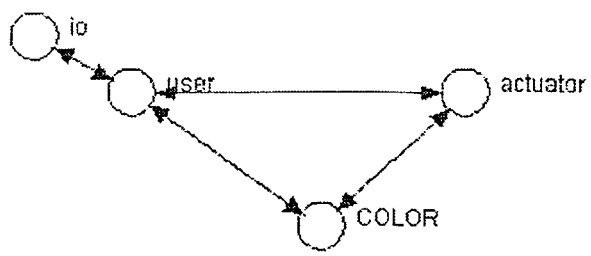
Figure 9:
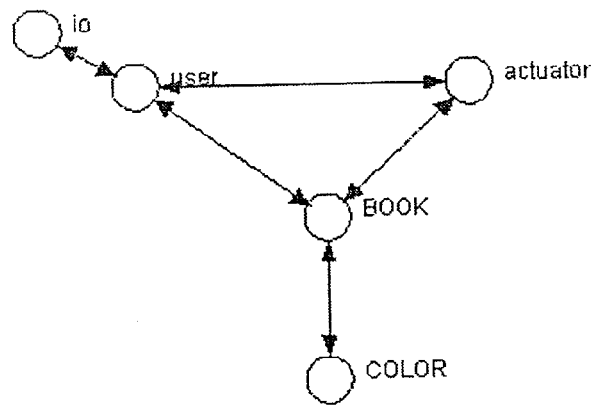
Figure 10:
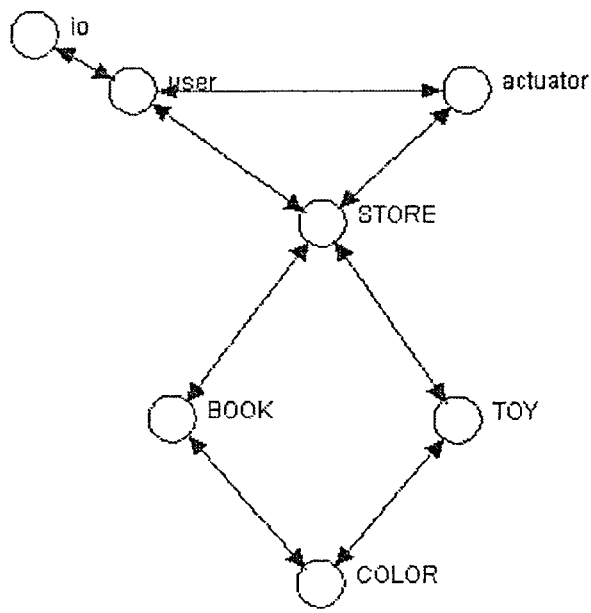

Step 1. Create the COLOR agent (See FIG. 8):

(TOKENS:
"
    ('red'|'blue'|'green')
        {title:'A color'}
        {action:
            {execute:'<color>,*,'/>'}}
"),
(RELATION:
"
    TOKENS ˆ ('and' TOKENS)
        {title:'Colors'}
"),
(CATCH:
"
    (TOKENS, RELATION)+
        {title:'Color'}
")
Step 2. Create the BOOK agent as an up chain of the COLOR agent (FIG. 9):

(TOKENS:
"
    'book'
        {title:'Book'}
        {action:
            {execute: '<book>?</book>'}
            {ask:'Which book?'}}
"),
(RELATION1:
"
    COLOR
        {title:'Book'}
        {action:
            {execute:'<book> ',COLOR, ' </>'}}
"),
(RELATION2:
"
    TOKENS & COLOR
        {title:'Book'}
        {action:
            {execute:'<book>',COLOR, ' </>'}}
"),
(RELATION3:
"
    COLOR TOKENS
        {title:'Book'}
        {action:
            {execute:'<book>',COLOR, ' </>'}}
"),
(CATCH:
"
    (TOKENS, RELATION1, RELATION2,RELATION3)+
        {title:'Book'}
")
Step 3. Create the TOY agent the same as the BOOK agent and join BOOK and TOY agents as down chain agents of the STORE agent (FIG. 10).

(CATCH:
"

-continued (BOOK, TOY)+
")

8. Best Practices Guidelines for Agent Network Design

1) Always include comments in your policies briefly describing why they are there and what they do. In general an observer should be able to understand the logic of why you have coded your agent the way you have. If it is too complex to understand, it is very likely that it needs some cleaning up.

2) If there are more than 6 policies in an agent rethink using a single agent for all these policies. It may also be that the agent has too big a fan-out.

3) Avoid too many agents reporting to a single agent (larger than 6 fan-out). Add agents to group down-chains into sub networks. Make sure the groupings correlate with the semantics of the application domain. Just as in menu structures, a big fan out is untidy and in our case they can also result in inefficient processing of policies that include operators like ˆ or *.

Categorization is possible and quite natural. After all, this is how our minds work to enhance our memory. It is much harder to memorize 16 down chains for one agent than it is 4, each of which lead to another.

We should use a domain expert in this case to identify the categorization.

The merits of limiting the fan out can be summarized as:

Efficiency (memory and speed),

Better reusability,

Better Interactions (where top agent knows input belongs to it but doesn't know which down-chain to delegate it to).

As for the fan out, if there are many agents down-chain to one, it is very likely that there does exist a categorization for these concepts in the domain expert's lingo that we are missing and we should probably cover. If this is the case, then recategorizing and decreasing the fan out based on the domain classifications and the resulting modularity will make those categories more readily reusable, and the interactions with the application more manageable for the end users. It will also make the policies in the top agent more readable and tidy. This added modularity may also help the efficiency of the application where operators such as "&" or other firm operators are used between all down-chains. This is because it reduces the number of claims the up-chain agent to the top node will be receiving when a policy containing operators such as the "&" of the down chains fires.

4) Avoid creating agents that do not represent the semantics of the application.

5) Start each agents list of policies with policies that pick the tokens associated with this agent. Then follow with policies that describe the relationships. At the end, include catch-all policies.

TOKENS: The condition of these policies has no reference to any other agent. The policies are made using binary and unary operators on token conditions, file terminals or database terminals.

RELATIONS: The condition of these policies describe the relationships between the policies in this agent and its down chain agents. These grammatical relationships are made by using operators such as &, |, <, optional and adjacent. All that can be part of one command should be combined using these operators.

CATCHALLS: The catchall policy of an agent is used to make the claims that no policies were written to deal with. That includes different combination of commands and ambiguities that may occur. The catchall policy includes a combo of references to all other policies and down chain agents of that agent followed by a + operator. A | (or) condition should be used instead of a combo between any two policies or down chain agents which should never make ambiguities.

6) Avoid using catch-alls extensively and try to cover them in Relations policies. For example try using the repeat operator (^) more often.

7) Try not to repeat all of the contents of another policy in the following policies. It is inefficient and untidy:

| | |
|---|---|
| Bad: | |
| | TOKENS: 'web' | 'wap' |
| | RELATIONS: ('web' | 'wap') & INDEX |
| Good: | |
| | TOKENS: 'web' | 'wap' |
| | RELATIONS: TOKENS & INDEX |

8) Any policy on its own may make a claim. Do not have policies that may claim lone words that are not relevant to the agent:

DUMMY_TOKEN: 'the'

In this case an agent, THE, should be created which claims 'the' but is never delegated to or referred to without constraining conditions around it.

9) Avoid using tags. Using "tags" and "check tags" mean that an agent has to be aware of policies of another agent (which could be a policy of an agent that is not an immediate down chain). This is against the agent oriented design principle where an agent should not care about the policies of another agent and should not be aware of any agent other than its immediate down chains. Therefore "tags" and "check tags" should be avoided if possible. There is usually a better way to write the policies or configure the agent network to avoid the usage of tags.

10) Avoid using <exists>

RELATIONS: <exists> 'token'

When using <exists>, an agent is checking against a part of the input that it is not going to claim. Therefore the agent must be aware of parts of the input that are possibly another agent's responsibility. This is against the agent oriented design principle where an agent should only care about its own domain and not worry about other domains. Therefore <exists> should always be avoided if possible. There is usually a better way to write the policies or configure the agent network to avoid the usage of <exists>.

There are cases where using <exists> is appropriate as in the example below:

In this example, we have a top level FIND agent. Below FIND there is a FILETYPE agent and a FOLDER agent. FILETYPE has down-chain agents that recognize specifications for different kinds of files; FOLDER uses down-chain agents to identify specs for starting directories.

Now imagine a request like "java in web". Both "java" and "web" are valid file types; both are valid directory nanes. What we wanted to do in FILETYPE is say that if we see a file spec followed by the word 'in', to see that as a stronger claim than one without it. Similarly, we want FOLDER to use 'in' to indicate that what follows may be a directory spec.

Clearly, we can't have both agents claiming 'in'. But 'in' is important for both. So we use <exists> to give the policy with 'in' a higher priority.

11) Avoid policies that may make a null claim:

TOKENS: ['a']

NULLTOKENS: ['a'] I ['b']

INTERESTING_TOKENS: ['a' & 'b']

NOTOKENS: <exists>% 'a'

WOWTOKENS: ['a'] & <exists> 'b'

OWTOKENS: <exists> ('a' & 'b')

9 Precedence table

The OPAL language guarantees that the operands of operators appear to be evaluated in a specific evaluation order, namely, from left to right.

| Precedence | Operator type | Operator |
|---|---|---|
| 0 | Terminals and references | 'sring' /NUMBER, /SYMBOL, /TYPE, /F /DB, /IDB, <check ( ... ) >, AGENT reference, POLICY reference, ?, ... |
| 1 | Brackets | ( operand ) [ operand ] operand+ |
| 2 | Unary | <exists> operand <check ... > <unknown .. > operand |
| 3 | Binary adjacent | operand1 operand2 operand1 ^ operand2 |
| 4 | Binary ordered | operand1 < operand2 operand1 < ^ operand2 |
| 5 | Binary and | operand1 & operand2 operand1 & ^ operand2 |
| 6 | Binary or | operand1 | operand2 |
| 7 | Binary combo | operand1 , operand2 |
| 8 | Unary tag | <tag: ... > operand <check tag: ... > operand |

Notes:
It is generally a good idea to use parentheses liberally in expressions involving mixed operators to avoid operator precedence problems.

10 Learning

A followup answer will be learned only if:

There would be a variable terminal (?) in the condition of the policy.

The agent asking the question would make a claim on the followup.

11 Claim Manipulation

The recursive operator (+) and most binary operators (adjacent, &, <,+ and combo) make their claims by merging other claims.

Merging claims:

Two claims $C^1$ and $C^2$ will merge if and only if one of the following conditions would hold:

1. $C_{focus}^1 \cap C_{focus}^2 = \phi$ (if $C^1$'s focus does not intersect with $C^2$'s focus)
2. $C_{loose\text{-}connection\text{-}count}^1 = 0$ and
   $C_{loose\text{-}connection\text{-}count}^2 = 0$ and
   $C_{focus}^1 \not\subset C_{focus}^2$ and
   $C_{focus}^2 \not\subset C_{focus}^1$ and
   $C_{priority}^1 = C_{priority}^2$ and
   ($C_{connection}^1 = C_{connection}^2$ or $C_{ambiguity}^1 > 0$ or $C_{ambiguity}^2 > 0$)
3. Conditions 1 and 2 hold for merging all claims that have been connected loosely to build $C^1$ and all sub-claims that have been connected loosely to build $C^2$.

Ambiguous Claims:

A claim C made by merging $C^1$ and $C^2$ is ambiguous if their focus' overlap: $C_{focus}^1 \cap C_{focus}^2 \neq \phi$

12 Policies in BNF Notation

12.1 BNF Notation

The following is the BNF notation used to describe the Policy's syntax:

::=Is interpreted as 'consists of' or 'is defined as'.

( )+ Parenthesis followed by a plus sign indicate that the sequence in the parenthesis may be repeated more than one time.

( )* Parenthesis followed by a plus sign indicate that the sequence in the parenthesis may be repeated zero or more times.

~( ) Parenthesis preceeded by a not sign indicate that all sequences except those in the parenthesis are legal.

[ ] Square Brackets State that the Sequence in the Brackets is Optional.

< > Names embedded in angle brackets are syntactic elements such as <integers>, <names> etc. All syntactic names will be defined i.e. they will appear on the left side of the '::=' symbol in a grammar rule.

" " Characters embedded in double quotes are keywords or characters.

- A dash between two characters defines a range of characters.

For example "0"- "3" is "0" |"1" |"2" |"3".

| A vertical bar is read 'or' and is used to separate alternatives.

Whenever a BNF notation is used as a keyword in the grammar it is preceded by an escape character: '\'.

12.2 Policy's BNF notation

Here is a BNF notation of the policy's grammar.

```
policy ::=
    label:
    "\"“
        <condition>
        ["{" "title:" <title> "}"]
        ["{" "xml tag:" <string literal> "}"]
        ["{" "xml type:" <string literal> "}"]
        ["{" "priority:" <integer> "}"]
        ["{" "continuation:" ("join"|"replace") "}"]
        ["{" "action:" <action>}]
        ["{" "ambiguity action:" <action> "}"]
        ["{" "unknown action:" <action> "}"]
    "\"”;
```

-continued

```
<label> ::= ["A" – "Z"|"_"] (["A" – "Z" | "0" – "9" | "_" | "-"])*
<title> ::= <string_literal>
<integer> ::= [+|-] ("0" – "9")+
<condition> ::= "(" <condition> ")"
<condition> ::= <ADJACENT_condition>
<condition> ::= <ORDERED_condition>
<condition> ::= <AND_condition>
<condition> ::= <OR_condition>
<condition> ::= <COMBO_condition>
<condition> ::= <OPTIONAL_condition>
<condition> ::= <TERMINAL_condition>
<condition> ::= <EXISTS>
<condition> ::= <TAG_condition>
<condition> ::= <CHECK_TAG_condition>
<condition> ::= <CHECK_condition>
<OPTIONAL_condition> ::= "[" <condition> "]"
<UNKNOWN_condition> ::= "<unknown if missing>" <condition>
<ADJACENT_condition> ::= <condition> <condition> |
                         <condition> "^" <condition>
<ORDERED_condition> ::= <condition> "<" <condition> |
                        <condition> "<^" <condition>
<AND_condition> ::= <condition> "&" <condition> |
                    <condition> "&^" <condition>
<OR_condition> ::= <condition> "|" <condition>
<COMBO_condition> ::= <condition> "," <condition>
<TERMINAL_condition> ::= <terminal>
<EXISTS_condition> ::= "<" "exists" ">" <condition>
<TAG_condition> ::=
    "<" "tag" ":" <string_literal> ">" <condition>
<CHECK_TAG_condition> ::=
    "<" "check" "tag" ":" <string_literal> ">" <condition>
<CHECK_condition> ::=
    "<" "check" "(" <agent_address> "," <property_name> ","
    <property_key> ";" <property_value> ")" ">" <condition>
<terminal> ::= <token_provider>
<terminal> ::= <number>
<terminal> ::= <symbol>
<terminal> ::= <agent_name>
<terminal> ::= <policy_name>
<terminal> ::= <variable>
<token_provider> ::=
    ["[" <matcher-list> "]"] "“" <string_literal> "”"
<token_provider> ::=
    ["[" <matcher-list> "]"] /F "“" <string_literal> "”"
<token_provider> ::=
    /DB "“" <string_literal> "”"
<matcher-list> ::=
    "<" (<matcher> | (<matcher> "," <matcher-list>)) ">"
<matcher> ::=
    "exact" | "substring" |
    "partial" | "accent" |"accent-edit-difference"
<number> ::= "/NUMBER" [ "(" <integer> "," <integer> ")" ]
<symbol> ::= "/SYMBOL"
<agent_name> ::=
    ["A" – "Z"|"_"] (["A" – "Z"|"0" – "9"| "_" | "-"])*
<policy_name> ::= ("/P" (["0" – "9"])+)
<variable> ::= "?"
<string_literal> ::=
    "“" (~(["\"","\\","\n","\r", "“"]) |
    <special_characters> )* "”"
<special_characters> ::=
    %BACK_SLASH% | %SINGLE_QUOTE% |
    %DOUBLE_QUOTE% | %NEW_LINE%
<action> ::=
    ["{" "execute:" <action_element_list> "}"]*
    ["{" "ask:" <action_element_list> "}"]*
    ["{" "choice:" <action_element_list> "}"]*
    ["{" "explain:" <action_element_list> "}"]*
<action_element_list> ::=
    <variable_action_element> ["," <action_element_list>]
<action_element_list> ::=
    <constant_action_element> ["," <action_element_list>]
<variable_action_element> ::= "*"
<variable_action_element> ::= "?"
<variable_action_element> ::= <agent_name>
<variable_action_element> ::= <policy_name>
<variable_action_element> ::=
    "set" "(" [<agent_address> ","] <property_name> ","
    <property_key> ";" <property_value> ")"
```

-continued

```
<variable_action_element> ::=
    "get" "(" [<agent_address> ","] <property_name> ","
        <property_key> ")"
<constant_action_element> ::= <string_literal>
<property_name> ::= <string_literal>
<property_key> ::= <string_literal>
<property_value> ::= <string_literal>
<expression> ::= <string_literal>
<agent_address> ::=
    <agent name> ["." <agent_class> "@" <agent_domain> ]
<agent_class> ::= <string_literal>
<agent_domain> ::= <string_literal>
```

We claim:

1. User interactive apparatus comprising:
a natural language interpreter having an input for receiving token sequences and an output for outputting commands toward a back-end application subsystem in response to said token sequences; and
an interaction subsystem having interfaces to each of first and second I/O agencies, said first and second I/O agencies communicating user input to said interfaces via respective first and second different I/O modalities, said interaction subsystem providing token sequences to said natural language interpreter in response to user input received by said interaction subsystem via each of said interfaces.

2. Apparatus according to claim 1, wherein said natural language interpreter comprises a distributed parser of natural language input.

3. Apparatus according to claim 1, wherein said natural language interpreter comprises an agent network.

4. Apparatus according to claim 3, wherein said agent network prepares said commands in dependence upon satisfaction, in said token sequences, of one or more policy conditions which make reference to one or more keywords in a predetermined set of keywords.

5. Apparatus according to claim 1, wherein said natural language interpreter comprises:
a plurality of agents arranged in a network, each of said agents having at least one interpretation policy having a policy condition and a policy action associated with the condition, each of said interpretation policies making a claim on at least part of a token sequence provided to the agent if the condition of the interpretation policy is satisfied, and executing the associated policy action in response to determination that the claim is at least part of a winning claim.

6. Apparatus according to claim 5, wherein a particular one of said agents has a particular interpretation policy having a policy condition that refers to a downchain one of said agents, any claim made by said particular policy being dependent upon any claims made by said downchain agent.

7. Apparatus according to claim 5, wherein a particular one of said agents has a particular interpretation policy having a particular policy condition that refers to a downchain one of said agents, said particular interpretation policy further having a particular policy action associated with said particular policy condition,
wherein said particular policy action includes at least partial delegation to said downchain agent.

8. Apparatus according to claim 1, wherein said interaction subsystem includes first and second interaction components, and wherein user input is received via said first and second I/O modalities according to first and second different input formats,
said first interaction component converting user input from said first I/O agency according to said first input format to token sequences according to a common format for providing to said natural language interpreter,
and said second interaction component converting user input from said second I/O agency according to said second input format to token sequences according to said common format for providing to said natural language interpreter.

9. Apparatus according to claim 1, wherein said interfaces further communicate output from said natural language interpreter to said first and second I/O agencies via respectively said first and second I/O modalities.

10. Apparatus according to claim 9, wherein said interaction subsystem includes first and second interaction components,
said first interaction component forwarding output from said natural language interpreter toward said first I/O agency via said first I/O modality,
and said second interaction component forwarding output from said natural language interpreter toward said second I/O agency via said second I/O modality.

11. Apparatus according to claim 1, wherein said interfaces further communicate output from said back-end application subsystem to said first and second I/O agencies via respectively said first and second I/O modalities.

12. Apparatus according to claim 11, wherein said interaction subsystem includes first and second interaction components,
said first interaction component forwarding output from said back-end application subsystem toward said first I/O agency via said first I/O modality,
and said second interaction component forwarding output from said back-end application subsystem toward said second I/O agency via said second I/O modality.

13. Apparatus according to claim 1, wherein said first agency has first layout characteristics and said second agency has second layout characteristics different from said first layout characteristics,
and wherein said interaction subsystem includes first and second interaction components,
said first interaction component converting output from said back-end application subsystem for presentation according to said first layout characteristics,
and said second interaction component converting output from said back-end application subsystem for presentation according to said second layout characteristics.

14. Apparatus according to claim 13, wherein said interfaces further communicate output from said back-end application subsystem to said first and second I/O agencies via respectively said first and second I/O modalities,
wherein said first interaction component forwards said output from said back-end application subsystem according to said first layout characteristics toward said first I/O agency via said first I/O modality,
and wherein said second interaction component forwards output from said back-end application subsystem according to said second layout characteristics toward said second I/O agency via said second I/O modality.

15. Apparatus according to claim 1, wherein said interfaces further communicate output from said natural language interpreter and from said back-end application subsystem to said first and second I/O agencies via respectively said first and second I/O modalities.

16. Apparatus according to claim 15, wherein said interaction subsystem includes first and second interaction components, said first interaction component forwarding output from said natural language interpreter and from said back-end application subsystem toward said first I/O agency via said first I/O modality, and said second interaction component forwarding output from said natural language interpreter and from said back-end application subsystem toward said second I/O agency via said second I/O modality.

17. Apparatus according to claim 1, wherein said first agency has first layout characteristics and said second agency has second layout characteristics different from said first layout characteristics.

18. Apparatus according to claim 17, wherein said interaction subsystem includes first and second interaction components, said first interaction component converting output from said natural language interpreter for presentation according to said first layout characteristics, and said second interaction component converting output from said natural language interpreter for presentation according to said second layout characteristics.

19. Apparatus according to claim 18, wherein said interfaces further communicate output from said natural language interpreter to said first and second I/O agencies via respectively said first and second I/O modalities, wherein said first interaction component forwards said output from said natural language interpreter according to said first layout characteristics toward said first I/O agency via said first I/O modality, and wherein said second interaction component forwards output from said natural language interpreter according to said second layout characteristics toward said second I/O agency via said second I/O modality.

20. Apparatus according to claim 17, wherein said interaction subsystem includes first and second interaction components, said first interaction component converting output from said natural language interpreter and from said back-end application subsystem for presentation according to said first layout characteristics, and said second interaction component converting output from said natural language interpreter and from said back-end application subsystem for presentation according to said second layout characteristics.

21. Apparatus according to claim 20, wherein said interfaces further communicate output from said natural language interpreter to said first and second I/O agencies via respectively said first and second I/O modalities, wherein said first interaction component forwards said output from said natural language interpreter and from said back-end application subsystem according to said first layout characteristics toward said first I/O agency via said first I/O modality, and wherein said second interaction component forwards output from said natural language interpreter and from said back-end application subsystem according to said second layout characteristics toward said second I/O agency via said second I/O modality.

22. User interactive apparatus comprising:

a natural language interpreter having an output for providing clarification requests toward a user in a common output format; and an interaction subsystem having interfaces to each of first and second I/O agencies, said first and second I/O agencies being arranged to receive output from said apparatus according to respective first and second different output formats, said interaction subsystem receiving said clarification requests in said common output format, converting a first subset of said clarification requests to said first output format and communicating them toward said first I/O agency, said interaction subsystem further converting a second subset of said clarification requests to said second output format and communicating them toward said second I/O agency.

23. Apparatus according to claim 22, wherein said natural language interpreter comprises a distributed parser of natural language input.

24. Apparatus according to claim 22, wherein said natural language interpreter comprises an agent network.

25. Apparatus according to claim 22, wherein said interaction subsystem includes first and second interaction components, said first interaction component converting said first subset of said clarification requests to said first output format and communicating them toward said first I/O agency, and said second interaction component converting said second subset of said clarification requests to said second output format and communicating them toward said second I/O agency.

26. Apparatus according to claim 22, wherein said natural language interpreter further has an input for receiving token sequences and an output for outputting commands toward a back-end application subsystem in response to said token sequences, and wherein said interfaces further communicate output from said back-end application subsystem to said first and second I/O agencies according to said respective first and second different output formats.

27. A user interaction method, comprising the steps of:

instantiating a first user interaction module having a user-side interface arranged to communicate with a user via a first I/O modality;

instantiating a second user interaction module having a user-side interface arranged to communicate with a user via a second I/O modality different from said first I/O modality; and instantiating a natural language interpreter having an input for receiving token sequences and an output for outputting commands toward a back-end application subsystem in response to said token sequences;

said first user interaction module receiving first user input via said first I/O modality, translating said first user input into first token sequences, and forwarding said first token sequences toward said natural language interpreter for interpretation;

and said second user interaction module receiving second user input via said second I/O modality, translating said second user input into second token sequences and forwarding said second token sequences toward said natural language interpreter for interpretation.

28. A method according to claim 27, further comprising the steps of:

said natural language interpreter outputting a command toward said back-end application subsystem in response to one of said first token sequences;

said back-end application subsystem providing a response to said command; and a particular one of said first and second user interaction modules receiving said response, translating said response into a form usable by the I/O modality of said particular user interaction module, and forwarding said response toward said user via the I/O modality of said particular user interaction module.

29. A method according to claim 28, further comprising the steps of:
said natural language interpreter outputting a second command toward said back-end application subsystem in response to one of said second token sequences;
said back-end application subsystem providing a second response to said second command; and
said second user interaction module receiving said second response, translating said second response into a form usable by said second I/O modality, and forwarding said second response toward said user via said second modality.

30. A method according to claim 27, further comprising the steps of:
said natural language interpreter issuing a clarification request in response to one of said first or second token sequences; and
said first user interaction module receiving said clarification request, translating said clarification request into a form usable by said first I/O modality, and forwarding said clarification request toward said user via said first modality.

31. A method according to claim 30, further comprising the steps of:
said natural language interpreter outputting a command toward said back-end application subsystem in response to one of said first token sequences;
said back-end application subsystem providing a response to said command; and
said first user interaction module receiving said response, translating said response into a form usable by said first I/O modality, and forwarding said response toward said user via said first modality.

32. A method according to claim 30, further comprising the steps of:
said natural language interpreter issuing a second clarification request in response to one of said second token sequences; and
said second user interaction module receiving said second clarification request, translating said second clarification request into a form usable by said second I/O modality, and forwarding said second clarification request toward said user via said second modality.

33. A method according to claim 32, further comprising the steps of:
said natural language interpreter outputting a first command toward said back-end application subsystem in response to one of said first token sequences;
said back-end application subsystem providing a first response to said first command;
said first user interaction module receiving said first response, translating said first response into a form usable by said first I/O modality, and forwarding said first response toward said user via said first modality;
said natural language interpreter outputting a second command toward said back-end application subsystem in response to one of said second token sequences;
said back-end application subsystem providing a second response to said second command; and
said second user interaction module receiving said second response, translating said second response into a form usable by said second I/O modality, and forwarding said second response toward said user via said second modality.

34. A method according to claim 27, further comprising the step of beginning an interpretation session in response to said step of said first user interaction module receiving first user input, said interpretation session identifying said natural language interpreter,
and wherein said step of said first user interaction module forwarding said first token sequences toward said natural language interpreter comprises the step of said first user interaction module routing said first token sequences toward the natural language interpreter identified in said interpretation session.

35. A method according to claim 27, further comprising the step of registering said first user interaction module with an interaction server.

36. A method according to claim 27, further comprising the step of registering said natural language interpreter with an interaction server.

37. A method according to claim 27, wherein said natural language interpreter comprises a distributed parser of natural language input.

38. A method according to claim 27, wherein said natural language interpreter comprises an agent network.

39. A method according to claim 38, wherein said agent network prepares said commands in dependence upon satisfaction, in said token sequences, of one or more policy conditions which make reference to one or more keywords in a predetermined set of keywords.

40. A method according to claim 27, wherein said natural language interpreter comprises:
a plurality of agents arranged in a network, each of said agents having at least one interpretation policy having a policy condition and a policy action associated with the condition, each of said interpretation policies making a claim on at least part of a token sequence provided to the agent if the condition of the interpretation policy is satisfied, and executing the associated policy action in response to determination that the claim is at least part of a winning claim.

41. A method according to claim 40, wherein a particular one of said agents has a particular interpretation policy having a policy condition that refers to a downchain one of said agents, any claim made by said particular policy being dependent upon any claims made by said downchain agent.

42. A method according to claim 40, wherein a particular one of said agents has a particular interpretation policy having a particular policy condition that refers to a downchain one of said agents, said particular interpretation policy further having a particular policy action associated with said particular policy condition,
wherein said particular policy action includes at least partial delegation to said downchain agent.

43. A user interaction method, comprising the steps of:
instantiating a first user interaction module having a user-side interface arranged to communicate with a user via a first I/O modality;
instantiating a second user interaction module having a second user-side interface arranged to communicate with a user via a second I/O modality different from said first I/O modality;
instantiating a natural language interpreter having an input for receiving token sequences from user interaction modules and an output for outputting commands toward a back-end application subsystem in response to said token sequences;
said natural language interpreter issuing a first clarification request in response to a token sequence received from said first user interaction module;

said first user interaction module receiving said first clarification request, translating said first clarification request into a form usable by said first I/O modality, and forwarding said first clarification request toward said user via said first modality;

said natural language interpreter issuing a second clarification request in response to a token sequence received from said second user interaction module; and said second user interaction module receiving said second clarification request, translating said second clarification request into a form usable by said second I/O modality, and forwarding said second clarification request toward said user via said second modality.

44. A method according to claim 43, further comprising the steps of:
said natural language interpreter outputting a command toward said back-end application subsystem in response to a token sequence received from said first user interaction module;
said back-end application subsystem providing a response to said command; and
said first user interaction module receiving said response, translating said response into a form usable by said first I/O modality, and forwarding said response toward said user via said first modality.

45. A method according to claim 43, further comprising the steps of:
said natural language interpreter outputting a second command toward said back-end application subsystem in response to a token sequence received from said second user interaction module;
said back-end application subsystem providing a second response to said second command; and
said second user interaction module receiving said second response, translating said second response into a form usable by said second I/O modality, and forwarding said second response toward said user via said second modality.

46. A method according to claim 45, further comprising the steps of:
said natural language interpreter outputting a first command toward said back-end application subsystem in response to a token sequence received from said first user interaction module;
said back-end application subsystem providing a first response to said first command;
said first user interaction module receiving said first response, translating said first response into a form usable by said first I/O modality, and forwarding said first response toward said user via said first modality.

47. A method according to claim 43, wherein said natural language interpreter comprises a distributed parser of natural language input.

48. A method according to claim 43, wherein said natural language interpreter comprises an agent network.

49. A method according to claim 48, wherein said agent network prepares said commands in dependence upon satisfaction, in said token sequences, of one or more policy conditions which make reference to one or more keywords in a predetermined set of keywords.

50. A method according to claim 43, wherein said natural language interpreter comprises:
a plurality of agents arranged in a network, each of said agents having at least one interpretation policy having a policy condition and a policy action associated with the condition, each of said interpretation policies making a claim on at least part of a token sequence provided to the agent if the condition of the interpretation policy is satisfied, and executing the associated policy action in response to determination that the claim is at least part of a winning claim.

51. A method according to claim 50, wherein a particular one of said agents has a particular interpretation policy having a policy condition that refers to a downchain one of said agents, any claim made by said particular policy being dependent upon any claims made by said downchain agent.

52. A method according to claim 50, wherein a particular one of said agents has a particular interpretation policy having a particular policy condition that refers to a downchain one of said agents, said particular interpretation policy further having a particular policy action associated with said particular policy condition,
wherein said particular policy action includes at least partial delegation to said downchain agent.

53. A user interaction method, comprising the steps of:
instantiating a first user interaction module having a user-side interface arranged to communicate with a user via a first I/O modality;
instantiating a second user interaction module having a user-side interface arranged to communicate with a user via a second I/O modality different from said first I/O modality; and
instantiating a natural language interpreter having an input for receiving token sequences from user interaction modules and an output for outputting commands toward a back-end application subsystem in response to said token sequences;
said natural language interpreter outputting a command toward said back-end application subsystem in response to one of said token sequences;
said back-end application subsystem providing a response to said command;
said first user interaction module receiving said response, translating said response into a form usable by said first I/O modality and forwarding said response toward said user via said first modality;
said natural language interpreter outputting a second command toward said back-end application subsystem in response to a token sequence received from said second user interaction module;
said back-end application subsystem providing a second response to said second command; and
said second user interaction module receiving said second response, translating said second response into a form usable by said second I/O modality, and forwarding said second response toward said user via said second modality.

54. A method according to claim 53, wherein said natural language interpreter comprises a distributed parser of natural language input.

55. A method according to claim 53, wherein said natural language interpreter comprises an agent network.

56. A method according to claim 55, wherein said agent network prepares said commands in dependence upon satisfaction, in said token sequences, of one or more policy conditions which make reference to one or more keywords in a predetermined set of keywords.

57. A method according to claim 53, wherein said natural language interpreter comprises:
a plurality of agents arranged in a network, each of said agents having at least one interpretation policy having a policy condition and a policy action associated with the condition, each of said interpretation policies making a claim on at least part of a token sequence provided to the agent if the condition of the interpretation policy is satisfied, and executing the associated policy action in response to determination that the claim is at least part of a winning claim.

58. A method according to claim 57, wherein a particular one of said agents has a particular interpretation policy having a policy condition that refers to a downchain one of said agents, any claim made by said particular policy being dependent upon any claims made by said downchain agent.

59. A method according to claim 57, wherein a particular one of said agents has a particular interpretation policy having a particular policy condition that refers to a downchain one of said agents, said particular interpretation policy further having a particular policy action associated with said particular policy condition, wherein said particular policy action includes at least partial delegation to said downchain agent.

* * * * *